(12) United States Patent
Noth

(10) Patent No.: US 10,740,583 B2
(45) Date of Patent: Aug. 11, 2020

(54) RECIPCODE AND CONTAINER OF SYSTEM FOR PREPARING A BEVERAGE OR FOODSTUFF

(71) Applicant: NESTEC S.A., Vevey (CH)

(72) Inventor: Andre Noth, Pully (CH)

(73) Assignee: Societe des Produits Nestle S.A., Vevey (CH)

( * ) Notice: Subject to any disclaimer, the term of this patent is extended or adjusted under 35 U.S.C. 154(b) by 56 days.

(21) Appl. No.: 16/078,975

(22) PCT Filed: Feb. 23, 2017

(86) PCT No.: PCT/EP2017/054152
§ 371 (c)(1),
(2) Date: Aug. 22, 2018

(87) PCT Pub. No.: WO2017/144579
PCT Pub. Date: Aug. 31, 2017

(65) Prior Publication Data
US 2019/0050616 A1 Feb. 14, 2019

(30) Foreign Application Priority Data
Feb. 23, 2016 (EP) ..................................... 16156864

(51) Int. Cl.
*G06K 7/10* (2006.01)
*G06K 19/06* (2006.01)
(Continued)

(52) U.S. Cl.
CPC ........ *G06K 7/1421* (2013.01); *A47J 31/4492* (2013.01); *G06K 9/00624* (2013.01); *G06K 19/06168* (2013.01); *B65D 85/816* (2013.01)

(58) Field of Classification Search
USPC ............................... 235/462.03, 462.01, 494
See application file for complete search history.

(56) References Cited

U.S. PATENT DOCUMENTS 5,345,435 A * 9/1994 Yamasaki .............. G11B 7/005
369/275.3
8,194,914 B1 6/2012 Skogg et al.
(Continued)

FOREIGN PATENT DOCUMENTS

AU 2007254626 7/2009
CL 2018002322 A1 8/2017
(Continued)

OTHER PUBLICATIONS

Machine English Translation of WO2011152296 (Year: 2011).*
(Continued)

*Primary Examiner* — Tuyen K Vo
(74) *Attorney, Agent, or Firm* — K&L Gates LLP

(57) ABSTRACT

A container for a beverage or foodstuff preparation machine, the container for containing beverage or foodstuff material and comprising a code encoding preparation information, the code comprising a reference portion and a data portion, the reference portion comprising an arrangement of at least two reference units defining a reference line r, the data portion comprising: a data unit arranged on an encoding line D which intersects the reference line r, the data unit arranged a distance d along the encoding line D from said intersection as a variable to at least partially encode a parameter of the preparation information, whereby the encoding line D is circular and is arranged with a tangent thereto orthogonal the reference line r at the intersection point; and a plurality of discrete positions arranged in operative proximity to the reference line r and distal the encoding line D, whereby said discrete positions either comprise or do not comprise a data unit as a variable to at least partially encode a parameter of the preparation information.

12 Claims, 8 Drawing Sheets

(51) Int. Cl.
  *G06K 7/14* (2006.01)
  *A47J 31/44* (2006.01)
  *G06K 9/00* (2006.01)
  B65D 85/816 (2006.01)

(56) References Cited

U.S. PATENT DOCUMENTS

2005/0269412 A1* 12/2005 Chiu .................... G06K 9/4633
 235/462.03
2009/0090786 A1* 4/2009 Hovis .................. G06K 7/1421
 235/494
2015/0351583 A1* 12/2015 Weigelt ............... A47J 31/4492
 426/87

FOREIGN PATENT DOCUMENTS

| WO | 2011152296 | 12/2011 |
| WO | 2014096082 | 6/2014 |
| WO | 2014096405 | 6/2014 |

OTHER PUBLICATIONS

Extended European search report dated Sep. 2, 2019 mailed in corresponding European Patent Application No. 19169183.1-1202, 8 Pages.
Chile Office Action for Appl No. 201802321 dated Dec. 4, 2019.

* cited by examiner

US 10,740,583 B2

RECIPCODE AND CONTAINER OF SYSTEM FOR PREPARING A BEVERAGE OR FOODSTUFF

CROSS REFERENCE TO RELATED APPLICATIONS

The present application is a National Stage of International Application No. PCT/EP2017/054152, filed on Feb. 23, 2017, which claims priority to European Patent Application No. 16156864.7, filed on Feb. 23, 2016, the entire contents of which are being incorporated herein by reference.

TECHNICAL FIELD

The described embodiments relate generally to beverage or foodstuff preparation systems which prepare a beverage or foodstuff from containers such as coffee capsules, and in particular to codes arranged on the container that encode preparation information for reading by a machine of said system.

BACKGROUND

Increasingly systems for the preparation of a beverage or foodstuff are configured to operate using a container that comprises a single-serving of a beverage or foodstuff material, e.g. coffee, tea, ice cream, yoghurt. A machine of the system may be configured for preparation by processing said material in the container, e.g. with the addition of fluid, such as milk or water, and the application of mixing thereto. Such a machine is disclosed in PCT/EP2013/072692. Alternatively, the machine may be configured for preparation by at least partially extracting an ingredient of the material from the container, e.g. by dissolution or brewing. Examples of such machines are provided in EP 2393404 A1, EP 2470053 A1, WO 2009/113035.

The increased popularity of these machines may be partly attributed to enhanced user convenience compared to a conventional preparation machine, e.g. compared to a manually operated stove-top espresso maker or cafetiére (French press).

It may also be partly attributed to an enhanced preparation process, wherein preparation information specific to the container and/or material therein is: encoded in a code on the container; read by the machine; decoded; and used by the machine to optimise the preparation process. In particular, the preparation information may comprise operational parameters of the machine, such as: fluid temperature; preparation duration; mixing conditions; and fluid volume.

Accordingly, there is a need to code preparation information on the container. Various codes have been developed, an example is provided in EP 2594171 A1, wherein a periphery of a flange of a capsule comprises a code arranged thereon. The code comprises a sequence of symbols that can be printed on the capsule during manufacture. A drawback of such a code is that its encoding density is limited, i.e. the amount of preparation information that it can encode is limited. A further drawback is that the code is highly visible and may be considered aesthetically displeasing. EP2525691 A1 discloses a container with a 2D barcode, which has a higher albeit limited encoding density.

Thus in spite of the considerable effort already invested in the development of said systems further improvements are desirable.

SUMMARY

An object of the present disclosure is to provide a container of a beverage or foodstuff system that comprises a code that has a high encoding density. It would be advantageous to provide such a code that is less visible than the prior art. It would be advantageous to provide such a code that is un-complicated such that it does not comprise a large number of symbols. It would be advantageous to provide such a code that can suitable encode parameters of the preparation information that have a wide numerical range. It would be advantageous to provide such a code that is cost-effective to produce and that can be read and processed by a cost-effective code processing subsystem. It would be advantageous to provide such a code that can be reliably read and processed.

Disclosed herein according to a first embodiment is a container for use (e.g. it is suitably dimensioned) by a beverage or foodstuff preparation machine, in particular the machine according to the fourth embodiment. The container for containing beverage or foodstuff material (e.g. it has an internal volume and may be food safe). The container may be a single-serving container, i.e. it is dimensioned for containing a dosage of beverage or foodstuff material for preparation of a single serving (e.g. pre portioned) of said product. The container may be a single-use container, i.e. it is intended to be used in a single preparation process after which it is preferably rendered unusable, e.g. by perforation, penetration, removal of a lid or exhaustion of said material. In this way the container may be defined as disposable. The container comprises (e.g. on a surface thereof) a code encoding preparation information, the code comprising a reference portion and a data portion. The reference portion providing a reference position for the data portion. The reference portion comprising an arrangement of at least two reference units defining a reference line r, which is linear. The data portion comprising at least one data unit, for example exactly one data unit, wherein the data unit is arranged on (e.g. with at least a portion thereof, generally a centre, intersecting said line) an encoding line D that intersects the reference line r, the data unit is arranged a distance d extending along said encoding line D (i.e. a circumferential distance d) from said intersection as a variable to at least partially encode a parameter of the preparation information (e.g. a parameter is entirely encoded by the data unit only or is encoded by several data units which may be arranged on the same or a different encoding line or is encoded in addition by metadata), whereby said encoding line D is semi (i.e. it comprises a segment of a circle) or fully circular and is arranged with a tangent thereto orthogonal the reference line r at said intersection point. The data portion further comprises a one or more of discrete positions arranged in operative proximity (i.e. such that they can be located using the reference line r) to the reference line r. whereby said discrete positions either comprise or do not comprise a data unit as a variable to at least partially encode a parameter of the preparation information.

One advantage is that the code has a high encoding density as it can encode a large amount of information and information types via combinations of the data units on the encoding line D and data units in the discrete positions. Moreover, it is advantageous to have a circular extending encoding line D since, for image processing, a Polar coordinate system can be utilised, whereby: the origin is typically a reference line orientation identifier defined by one or a plurality of reference units, said identifier being arranged at an axial centre of the encoding line; each data unit has an angle defined as between the reference line r and said radial line. The distance d can be determined conveniently by the said angle and said radial distance. Image processing of a code using this coordinate system is less computationally intensive than for an example code that uses a Cartesian coordinate system, whereby the axis are defined by a reference line and a linear encoding line that extends orthogonally thereto. In particular a Cartesian arrangement requires the image of the code reorienting during processing which is obviated when using a Polar coordinate system. In this way a more cost-effective image processor can be used. Moreover the code has a high encoding density since a plurality of encoding lines D can be arranged concentrically about the origin, with each comprising one or more associated data unit.

A data unit may be arranged on the encoding line any continuous distance d from the intersection point. One advantage is that the code has a high encoding density as it can encode information in a continuous manner rather than a discrete manner. Alternatively, the data units may be arranged only discrete distances from the intersection point (i.e. the data unit can only occupy one of a plurality of predetermined positions along the line D, which generally do not overlap and may have a discrete separation between adjacent positions). In the instance of more than one encoding line D and/or more than one data units arranged along the line(s) the data units may be arranged with combinations of continuous and discrete distances.

The preparation information may comprise information that is related to a preparation process, e.g. one or more parameters used by the machine such as: temperature; torque and angular velocity (for mixing units of machines which effect mixing); flow rate and/or volume; pressure; % cooling power; time (e.g. for which a phase comprising one or more of the aforesaid parameters are applied for); expiry date; container geometric properties; phase identifier (for containers comprising multiple codes, whereby each of which encodes a distinct phase of a preparation process); container identifier; recipe identifier; pre-wetting volume.

In particular the encoding of the parameters can selectively be encoded using the data units of the discrete positions or the encoding line D according to the parameter type. Parameters which can only assume discrete values are preferably encoded by data units at the discrete positions, such as one or more of: expiry date; phase identifier; container or product identifier; and container geometric properties e.g. volume; an exponent or a sign that may be associated with a parameter encoded on an encoding line D; a recipe identifier that may be used to retrieve one or more parameters of the machine which are used by the machine to prepare the product, wherein said parameters may be stored on the machine; the identifier of a formula or lookup table associated with a parameter encoded on an encoding line D. Parameters which can assume a wide range of values, which may be continuous, are preferably encoded via data units on the encoding line D, such as one or more of: temperature; fluid volume; flow rate; torque and angular velocity; time; % cooling power. Moreover a particular parameter may be encoded by both the data units of the discrete positions or the encoding line D, e.g. the data units of the discrete positions encode an exponent or sign associated with the value encoded by the encoding line D.

The code preferably has a planform with a peripheral length (e.g. a diameter of a circular or polygonal periphery or a side length of a rectangular periphery) of 600-1600 µm or 600-6000 µm. One advantage is that the code is not particularly visible. A further advantage is that capturing an image of the code for reading and decoding the information contained therein can be done with a small image capturing device, for example with a camera having dimensions in the magnitude of a few millimetres, whose size provides for an easy and reliable integration in a machine according to the fourth embodiment. More particularly, the units (i.e. the data units and reference units) that comprise the code preferably have a unit length of 50-250 µm. The aforesaid unit length may be defined as: a diameter for a substantially circular unit; a side length for a quadrilateral unit; other suitable measure of length for a unit of another shape of unit.

A rectangular planform of the code is advantageous since it forms a tessellating shape. A tessellating shape is particularly advantageous since a plurality of codes can be compactly repeated on the container, e.g.: for read error checking, thereby allowing the design of robust code decoding algorithms able to correct code reading and/or decoding errors using several codes encoding the same information and thus minimizing the code reading failure rate; and/or with separate phases of a preparation process encoded by each code. Accordingly, the first embodiment may comprise a plurality of the said codes formed on a container in an at least partially tessellating manner (e.g. a grid with adjacent columns aligned or with adjacent columns offset), whereby the codes preferably encode different phases of a preparation process.

Encoding several phases of a preparation process on a container allows for example encoding all parameters necessary for the preparation of complex recipes, for example recipes comprising several preparation phases and/or recipes requiring simultaneous or sequential processing of two or more containers and/or of two or more ingredients in two or more compartments within the same container, in order to obtain two or more ingredients such as for example milk and coffee, ice-cream and topping, milkshake and flavouring, etc.

According to the invention, all processing parameters necessary for a recipe being preferably encoded in one or more codes on the corresponding one or more containers, recipes may be updated by providing containers with updated codes thereon, said updated codes encoding updated/modified/new parameter values. New recipes and/or new containers with specific parameter values may furthermore be introduced and processed by a machine according to the fourth embodiment without reprogramming of the machine. Accordingly, updated and/or new recipes may be introduced in the system of the invention without having to update the machine's soft- or firmware.

The Attachments According to the Further Embodiments May Also Comprise the Aforesaid Plural Code Arrangement The one or more discrete positions may be arranged distal the encoding line D (e.g., discrete therefrom, not touching said line). The one or more discrete positions may be arranged at an inner periphery of the encoding line(s) D, and preferably proximal an axial centre thereof. One advantage is that the encoding density is increased since the area of the code that does not encode information is minimised. Adjacent discrete positions may be equidistantly disposed about one or more circular line(s) which are concentric the encoding line(s) D. The one or more discrete positions may be arranged at an outer periphery of the encoding line(s) D. One advantage is that the encoding density is increased since the area of the code that does not encode information is minimised. Adjacent discrete positions may be equidistantly disposed about one or more circular line(s) which are concentric the encoding line D. In particular, the code when comprising a rectangular (e.g. a square) planform, may comprise the discrete positions arranged within said planform and proximal one or more vertices thereof. More particularly, the encoding line(s) D may extend proximal a mid-point of the side length of said planform to define four regions proximal the vertices, one or more of which comprising the discrete positions. The discrete positions may be symmetrically disposed about one or both diagonals extending from the vertices. One advantage is that, the combination of encoding with discrete positions and encoding line(s) D combine to provide a tessellating shape.

The one or more discrete positions may be arranged on the encoding line D. They may be arranged proximal the data unit on the encoding line D, for example, at a greater or lesser distance d. Preferably, said positions are arranged at a predetermined distances from the data unit, such as a length of the data unit between the peripheral gap between adjacent units. One advantage is that the amount and format of data (e.g. continuous and discrete) that can be increased.

The reference portion may comprise one or more reference units as a reference line orientation identifier, which preferably defines a reference point from which the reference line r extends. In examples not comprising said orientation identifier the reference point may be identified as: a portion at the end of the reference line r, which can be defined by a plurality of same reference units; and/or as point without an associated encoding line D having a data unit arranged thereon and that intersects said reference unit. Preferably the orientation identifier is arranged at a centre of the circle defined by the encoding line D.

In the example of one reference unit comprising said orientation identifier the aforesaid reference point is preferably at the centre of the reference unit. Preferably the reference point is arranged at an axial centre of the encoding line D. The reference unit may be identifiable from other units of code by one or more of the following: it comprises a reference unit distinct from the other units of the code in terms of one of more of the following: shape, size, colour. One advantage is that it is convenient for a processor to determine an orientation of the reference line r. The orientation identifier is for example a unit greater in size than the other units of the code and is arranged at an axial centre of the encoding line D. One advantage is that, since an encoding line D cannot be arranged at the axial centre, the planform comprising the code is efficiently utilised.

In the example of a plurality of reference units comprising said orientation identifier, each of the plurality of reference units may be the same as the other data unit(s) of the code and/or the other reference unit(s) that comprise the reference line r. In particular the reference units that comprise the reference unit orientation identifier may be arranged with a configuration defining the aforesaid reference point from which the reference line r extends. Preferably the reference point is arranged at an axial centre of the encoding line D. Said configuration may comprise a 2 dimensional polygon with the reference units arranged at the vertices and said reference point at the centre or at another geometrically defined position of the polygon. The polygon is for example a polygon with equal side lengths. The polygon may be one selected from a group comprising: a triangle; square; pentagon; hexagon; heptagon; octagon. One advantage of having all of the units of the code the same is the complexity of processing the code is reduced. In particular, a computer program only has to determine the presence of a unit and its centre, as opposed to discriminated between different shapes and/or colours. Consequently a more cost effective processor can be utilised in the beverage or foodstuff preparation machine.

The reference line r preferably extends through or at a predetermined minimal distance, or offset, from a central point of a further reference unit. The further reference unit of the reference portion may be identifiable by one or more of the following: it is arranged at a greater radial position from said orientation identifier (i.e. between their said points) than the data units and/or at a predetermined reserved radial position from said orientation identifier (e.g. a particular position, such as 400-600 µm), whereby the data units are not arranged at said predetermined radial position; it is distinct from the other units of the code in terms of one of more of the following: shape, size, colour; it is arranged at an end of or at a predetermined minimal distance, or offset, from the reference line r. One advantage is that, the reference line r can be conveniently determined by locating the orientation identifier and the further reference unit. To maintain compact formation of the code it is preferable to represent the further reference unit by a unit no larger in size than the data units, e.g. by the same shape and size unit.

According to the invention, the code thus comprises reference units defining a reference point and a reference line for determining the centre and orientation of the polar code. There is therefore no requirement of a specific alignment of the container relative to the image capturing device when placed in the machine of the fourth embodiment for processing. The code processing subsystem will be able to determine the centre and orientation of the code with the position of the reference units in a captured image, independently of the relative orientation of the container and the image capturing device when the image was taken.

The data portion may have an encoding area, within which the encoding lines D are arranged, the data units thereof being arrange within the bounds of the encoding area. The encoding area is preferably circular at a periphery, whereby the encoding lines D preferably extend concentrically about an axial centre thereof. More particularly, the encoding area may be annular. One advantage is that, with an annular arrangement the data units are not arranged in close proximity to the axial centre of the annuli where the circumferential distance of the encoding line D is less such that there is less precision in the determined distance d. A portion of the encoding area may be bounded by the reference line r, e.g. the encoding area is annular and is radially intersected by the reference line r.

Preferably a data unit on the encoding line D may be arrangeable up to the reference line r but not overlapping, i.e. a periphery of the data unit can be coincident to and extend from the reference line. Alternatively, a data unit is not arrangeable coincident the reference line r, the closest distance thereto being proximal but with a predetermined minimum distance therefrom. One advantage is that there is sufficient separation between the reference line r and data units for processing. Preferably the units are not arranged overlapping each other.

The encoding line D may intersect the reference line r at a reference position and the reference position may be absent a reference unit, whereby the or each reference position is arranged a predetermined distance along the reference line, e.g. from the or each reference unit of the orientation identifier or other position. Preferably the reference units are arranged external (i.e. not arranged within) the encoding area. One advantage is that, the encoding density is increased since the data units can be arranged in close proximity to the reference line r, e.g. without needing to ensure there is adequate separation between the data unit and a reference unit that would otherwise be on said line. The aforesaid predetermined distance can be defined as a set amount such that the adjacent reference positions are equidistant e.g. a distance between the ends of the reference line r divided by a number of reference positions.

Alternatively the encoding line D may intersect the reference line r at a reference position, whereby the reference position comprises a reference unit. One advantage is that the image processor can determine conveniently the positions of the encoding lines D.

A data unit of the encoding line(s) D may further encode metadata associated with the parameter. The metadata is preferably encoded discretely (e.g. it can assume one of a predetermined number of values). The metadata is generally to: enable identification of the particular parameter; and/or a property associated with the parameter (e.g. a ± or an exponent). A unit length of a data unit may be selected from one of a plurality of predetermined unit lengths as a variable to encode the metadata. The aforesaid unit length may be defined as: a diameter for a substantially circular unit; a side length for a quadrilateral unit; other suitable measure of length for a unit of another shape of unit. An offset of a centre of a data unit from the encoding line D along a line, the line extending radially from an axial centre of the circular encoding line D, may be selected from one of a plurality of predetermined offsets as a variable to encode the metadata. Preferably said offset is achieved within the bounds of at least part of the associated data unit intersecting the encoding line D.

The data portion may comprise a plurality of encoding lines D (e.g. up to 2, 3, 4, 5, 6, 10, 16, 20 or more), each comprising a corresponding arrangement of a data unit (i.e. the data unit is arranged a distance d from an intersection point to at least partially encode a parameter). Preferably, the encoding lines D are concentrically arranged and preferably intersect the reference line r at a different position.

Moreover a plurality of data units may be arranged along a single encoding line D. One advantage is that the encoding density is increased. In such an arrangement each data unit may be identifiable by the metadata. Each of the said data units may encode a separate parameter. Alternatively a plurality of the data units may encode a single parameter, whereby a distance d encoding said parameter may be a function (e.g. an average or a multiple) of the distances do of said plurality of data units.

The data units and reference units may be formed by one of the following: printing (e.g. by a conventional ink printer, one advantage is that the code can be conveniently and cost-effectively formed); engraving; embossing. The code may be formed directly on a surface of the container, e.g. the substrate for the units is integral with the container. Alternatively the code may be formed on an attachment, which is attached to the container.

The container may comprise the beverage or foodstuff material contained therein. The container may comprise one of the following: capsule; packet; receptacle for end user consumption of the beverage or foodstuff therefrom. The capsule may have an internal volume of 5-80 ml. The receptacle may have an internal volume of 150-350 ml. The packet may have an internal volume of 150-350 ml or 200-300 ml or 50-150 depending on the application.

Disclosed herein according to a second embodiment is a method of encoding preparation information on: a container for a beverage or foodstuff preparation machine, the container for containing beverage or foodstuff material; or an attachment for attachment to said container or said machine. The method may comprise encoding information with the code according to any feature of the first embodiment. In particular the method may comprise: arranging at least two reference units to define a reference line r; of a reference portion; at least partially encoding a parameter of the preparation information with a data portion of the code by arranging a data unit on an encoding line D that intersects the reference line r, the data unit being arranged a distance d extending along the encoding line D from said intersection as a variable for said encoding, whereby said encoding line D is circular and is arranged with a tangent thereto orthogonal the reference line r at said intersection point; at least partially encoding a parameter of the preparation information with one or more discrete positions, which are arranged in operative proximity to the reference line r, wherein said discrete positions either comprise or do not comprise a data unit as a variable to at least partially encode a parameter of the preparation information. The method may comprise forming the code by one of the following: printing; engraving; embossing. The method may comprise forming a plurality of said codes preferably in an at least partially tessellating arrangement.

Disclosed herein according to a third embodiment is a method (e.g. a computer implemented method) of decoding preparation information, the method comprising obtaining a digital image of a code of a container according to the first embodiment, or the attachments according to the seventh and eighth embodiments; processing said digital image to decode the encoded preparation information.

Processing of the digital image to decode the preparation information may comprise: locating the reference and data units of the code; identifying the reference units and determining therefrom a reference line r; determining (i.e. for the or each of the encoding lines D) for a data unit a distance d along the encoding line D from the reference line r; converting the determined distance d into an actual value of a parameter $V_p$; determining the location of one or more discrete positions, determining if they comprise a data unit, deriving therefrom a parameter $V_p$.

The locating of the units of the code (i.e. data and reference units) may comprise one or more of the following: conversion of the digital image to a binary image; determining a centre of the units by feature extraction; determining a size/area/shape of the units by pixel integration (i.e. determining a number of pixels of a shaded region that comprises the unit).

Identifying the reference units and determining therefrom a reference line r may comprise one or more of the following: identifying units with a linear arrangement; identifying units and/or points defined by units that are a predetermined distance apart; identifying units that are a particular shape or size or colour; identifying particular configurations of units. Preferably it comprises identifying the or each reference unit corresponding to the orientation identifier that is arranged at a centre of a circle defined by the circular extending encoding lines D by one or more of shape, size, colour, configuration (for a plurality of units defining said identifier) and optionally determining a reference unit with a greater radial position from the orientation identifier than the data units and/or at a predetermined reserved radial position from the orientation identifier.

Determining for each data unit a distance d along the encoding line D from the reference line r may comprise determining a circumferential distance, i.e. by means of the angle observed at the centre of the encoding line (typically the reference point of the orientation identifier) between the reference line r and the data unit together with the radial distance of said data unit from said centre. Alternatively it may comprise determining an angular distance, i.e. by means of the angle observed at the centre of the encoding line between the reference line r and the data unit, whereby the radial distance may be used to identify the data unit with respect to a reference position. The latter is preferable since less processing steps are required. In each case the distance may be corrected to account for magnification/reading distance.

Converting the determined distance d into an actual value of a parameter $V_p$ may comprise converting the determined distance d into an actual value of a parameter $V_p$ using a stored relationship (e.g. information stored on a memory unit of the machine, which may comprise the memory subsystem) between the parameter and distance d. The relationship may be linear, e.g. $V_p \propto d$ and/or it may be non-linear. The relationship may comprise at least one selected from a group consisting of: a logarithmic relationship, e.g. $V_p \propto \log(d)$; an exponential relationship, e.g. $V_p \propto e^d$; a polynomial; a step function; linear. Exponential and logarithmic relationships are particular advantageous when the accuracy of a parameter is important at low values and less important at high values or the converse respectively. Typically the relationship is stored as an equation or as a lookup table. The relationship may be applied to any suitable variable of the preparation information, such as: temperature; torque; flow rate/volume; pressure; % cooling power. One advantage is the execution of complex recipes, which may be determined by the particular material in the container and the functionality of the machine.

Processing of the digital image to decode the preparation information may further comprise determining metadata associated with the data unit of the encoded parameter, e.g. by one or more of the following: determining a unit length of a data unit; determining an offset of a data unit to the encoding line D. The aforesaid determining may be by feature extraction or overall area/shape by pixel integration.

Determining the location of one or more discrete positions may comprise using the identified position of the reference line r. It may further comprise using: stored information, e.g. there are a known number of discrete positions arranged at known locations with respect to the position of the reference line r; and/or the arrangement of a data unit along an encoding line D. Determining if the discrete positions comprise a data unit may comprise a data unit may comprise feature extraction or other known technique. Deriving from the presence of the data units at the discrete positions a parameter $V_p$ may comprise using stored information (e.g. a look up table) to decode the encoded parameter(s).

Disclosed herein according to a fourth embodiment is a beverage or foodstuff preparation machine comprising: a container processing subsystem to receive a container according to the first embodiment and to prepare a beverage or foodstuff therefrom; a code processing subsystem operable to: obtain a digital image of the code of the container; process said digital image to decode the encoded preparation information; a control subsystem operable to effect one more of the following: control of said container processing subsystem using said decoded preparation information; use of the preparation information to monitor container consumption for re-ordering, e.g. via a server system through a communication interface; use of the preparation information to determine if a container has exceeded its expiry date. The code processing subsystem may further be configured to process the digital image of the code according to the third embodiment.

Control of said container processing subsystem using said decoded preparation information may in particular comprise executing a preparation process in phases, whereby preparation information for the phases is decoded from a code and/or from a plurality of codes encoding a plurality of phases as according to the first embodiment. Said decoded preparation information for several phases may for example be used to control the container processing subsystem to perform complex recipes implying for example processing of two or more containers, and/or processing of two or more ingredients in several individual compartments within a same container, preferably upon a single user actuation, for example upon a single push of a button of the machine's user interface. In embodiments, based for example on the information decoded from a first container, the control subsystem checks for the presence in the machine of a particular second container or ingredient compartment, before or after processing the first container or ingredient compartment, and pauses the preparation process if said second container or ingredient compartment cannot be found. Once a second container or ingredient compartment of the expected type is detected in the machine, the preparation process is resumed and the second container or ingredient compartment is processed.

The container processing subsystem generally is operable to perform said preparation by the addition of fluid, such as water or milk to the beverage or foodstuff material. The container processing subsystem may comprise one of: an extraction unit; a dissolution unit; a mixing unit. The container processing subsystem may further comprise a fluid supply that is operable to supply fluid to the aforesaid unit. Generally the fluid supply comprises a fluid pump and a fluid heater. The aforesaid units may be configured for operation with one or more container containing beverage or foodstuff material.

Disclosed herein according to a fifth embodiment is a beverage or foodstuff preparation system comprising a container according to the first embodiment and a beverage or foodstuff preparation machine according to the fourth embodiment.

Disclosed herein according to a sixth embodiment is a method of preparing a beverage or foodstuff using the system according to the fifth embodiment, the method comprising: obtaining a digital image of a code according to the first embodiment (which may be arranged on the container or the attachments according to further embodiment); processing said digital image to decode the encoded preparation information; operating a control subsystem to effect one more of the following: control of said container processing subsystem using said decoded preparation information; use of the preparation information to monitor container consumption for re-ordering, e.g. via a server system through a communication interface; use of the preparation information to determine if a container has exceeded its expiry date.

The method may further comprise any of the steps of processing the digital image of the code according to the third embodiment.

Disclosed herein according to a seventh embodiment is an attachment configured for attachment to a container for a beverage or foodstuff preparation machine according to the fourth embodiment. The container is preferably according to any feature of the first embodiment, preferably without the code thereon. The attachment may comprise: a carrier carrying (e.g. on a surface thereof) a code according to the first embodiment; an attachment member for attachment to said container. The attachment is preferably configured for attaching said carrier to the container as if the code were formed integrally on the container. In this way the code can be read by an image capturing device as if it were formed integrally thereon. The attachment may be configured to extend over a substantial portion of the container, e.g. a base or lid or rim. Examples of suitable attachment members comprise: an adhesive strip (or a planar region for receiving adhesive); a mechanical fastener such as a clip or bolt.

Disclosed herein according to an eighth embodiment is an attachment configured for attachment to a beverage or foodstuff preparation machine according to the fourth embodiment. The attachment may comprise: a carrier carrying (e.g. on a surface thereof) a code according to first embodiment; an attachment member for attachment to said machine. The attachment member is preferably configured for attaching said carrier to the machine at a position between an image capturing device of said machine and the container when received, such that the code thereon is proximate said container. In this way it can be read by the image capturing device as if it were attached to the container. Examples of suitable attachment members comprise: extensions attached to said carrier comprising an adhesive strip (or a planar region for receiving adhesive) or a mechanical fastener such as a clip, bolt or bracket.

Disclosed herein according to a ninth embodiment is a use of a container as defined in the first embodiment or the attachments as defined in the seventh and eighth embodiment for a beverage or foodstuff preparation machine as defined in the fourth embodiment.

Disclosed herein according to a tenth embodiment is a use of a code as defined in the first embodiment for encoding preparation information preferably on: a container of a beverage or foodstuff preparation machine, the container for containing beverage or foodstuff material as defined in the first embodiment; or an attachment according to the seventh or eighth embodiment.

Disclosed herein according to a eleventh embodiment is provided a computer program executable on one or more processors of a code processing subsystem of a beverage or foodstuff preparation machine generally as defined in the fourth embodiment to decode encoded preparation information. The computer program may comprise program code executable by the or each processor and/or program logic implemented on the or each processor (it may also comprise program code for implementation of said program logic). The computer program may be operable to decode the information of the code according to any feature of the first embodiment via any feature of the third embodiment. The computer program may further be executable to obtain (e.g. by controlling an image capturing device) said digital image of the code.

The functional units described by the computer programs generally herein may be implemented, in various manners, using digital electronic logic, for example, one or more ASICs or FPGAs; one or more units of firmware configured with stored code; one or more computer programs or other software elements such as modules or algorithms; or any combination thereof. One embodiment may comprise a special-purpose computer specially configured to perform the functions described herein and in which all of the functional units comprise digital electronic logic, one or more units of firmware configured with stored code, or one or more computer programs or other software elements stored in storage media.

Disclosed herein according to an twelfth embodiment is provided a non-transitory computer readable medium comprising the computer program according to the eleventh embodiment. The non-transitory computer readable medium may comprise a memory unit of the processor or other computer-readable storage media for having computer readable program code for programming a computer stored thereon, e.g. a hard disk, a CD-ROM, an optical storage device, a magnetic storage device, Flash memory; a storage device of a server for download of said program.

Disclosed herein according to a thirteenth embodiment is an information carrying medium comprising the code according to the first embodiment. In particular the information carrying medium may comprise the container as defined herein, either of the attachments as defined herein, or a substrate, such as an adhesive strip of other suitable medium.

The method of encoding preparation information according to the second embodiment may be applied to the information carrying medium. The method of decoding preparation information according to the third embodiment may be applied to the information carrying medium. The beverage or foodstuff preparation machine according to the fourth embodiment may be configured for operation with the information carrying medium, e.g. via its attachment to the container or other suitable component, such as either of the aforedescribed attachments. The system according to fifth may comprise the information carrying medium. The method of preparing a beverage or foodstuff of the sixth embodiment may be adapted to comprise obtaining a digital image of the code of the information carrying medium.

The preceding summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Moreover, the above embodiments may be combined in any suitable combination to provide further embodiments. Other features, aspects, and advantages of the subject matter described herein will become apparent from the following Detailed Description, Figures, and Claims.

DETAILED DESCRIPTION OF EXEMPLARY EMBODIMENTS

Figure 1A:
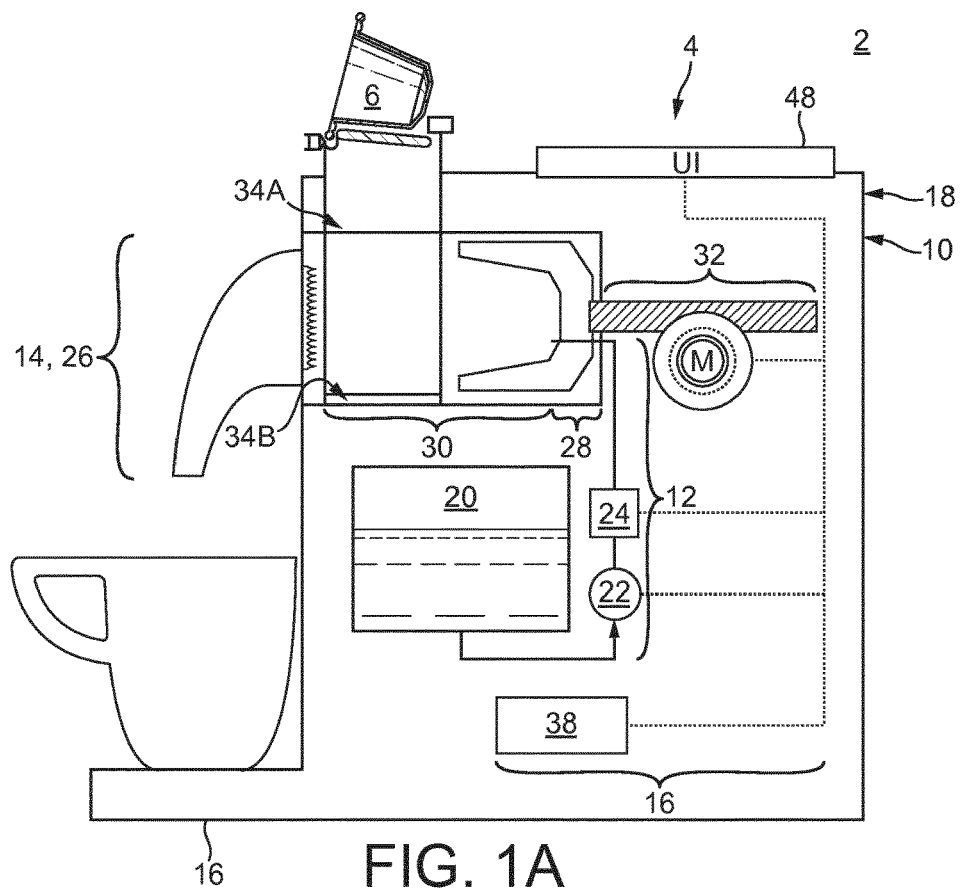
FIG. 1 is a diagrammatic drawing illustrating embodiments of beverage or foodstuff preparation systems that comprises a machine and a container according to embodiments of the present disclosure.

Beverage/Foodstuff Preparation System A beverage or foodstuff preparation system 2, an embodiment of which is illustrated in FIG. 1, comprises: a beverage or foodstuff preparation machine 4; a container 6, which are described following.

Preparation Machine

The beverage or foodstuff preparation machine 4 is operable to process a beverage or foodstuff material (hereon material) arranged in the container 6 to a foodstuff and/or beverage for consumption by eating and/or drinking. Generally processing comprises the addition of fluid, such as water or milk to said material. A foodstuff material as defined herein may comprise a substance capable of being processed to a nutriment generally for eating, which may be chilled or hot. Generally the foodstuff is a liquid or a gel. Non-exhaustive examples of which are: yoghurt; mousse; parfait; soup; ice cream; sorbet; custard; smoothies. Generally the foodstuff is a liquid, gel or paste. A beverage material as defined herein may comprise a substance capable of being processed to a potable substance, which may be chilled or hot, non-exhaustive examples of which are: tea; coffee, including ground coffee; hot chocolate; milk; cordial. It will be appreciated that there is a degree of overlap between both definitions, i.e. a said machine 4 can prepare both a foodstuff and a beverage.

The machine 4 is generally dimensioned for use on a work top, i.e. it is less than 70 cm in length, width and height.

The machine 4 comprises: a housing 10; a container processing subsystem 14; a control subsystem 16; and a code processing subsystem 18.

Housing

The housing 10 houses and supports the aforesaid machine components and comprises: a base 108 for abutment of a horizontally arranged support surface; a body 110 for mounting thereto said components.

Container Processing Subsystem

Depending on the particular embodiment the container processing subsystem 14 (which may also be considered a preparation unit) may be configured to prepare a foodstuff/beverage by processing material arranged in: one or more single-serving, single use container 6 that is a packet or capsule; a container 6 that is a receptacle for end-user consumption therefrom. In particular the material is processed to effect a change of its composition, e.g. by dissolution or extraction or mixing of an ingredient thereof. Embodiments of each configuration of will be discussed. Two or more such configurations may be combined in a single container processing subsystem 14 in order for example to prepare a foodstuff/beverage from material contained in two or more containers 6 and requiring different processing. In embodiments, a container processing subsystem 14 may for example be configured to simultaneously or sequentially: in a pressurised extraction unit, extract coffee from a capsule containing ground coffee and; in a dissolution unit, dilute powdered milk contained in a packet; in order to prepare a milk and coffee beverage such as for example a cappuccino, a cafe latte or a latte macchiato. In other embodiments, a container processing subsystem 14 may for example be configured to simultaneously or sequentially: prepare at least part of a foodstuff/beverage in a receptacle for end user consumption in a mixing unit and; possibly dilute material contained in a container and dispense it into the receptacle; in order for example to prepare a serving of ice-cream with topping or a flavoured milk-shake. Other feature combinations in a single container processing subsystem 14 are however possible within the frame of the invention in order to allow the preparation of foodstuff/beverages according to other complex recipes.

In general in all the embodiments the container processing subsystem 14 comprises a fluid supply 12 that is operable to supply fluid to the container 6. The fluid is in general water or milk, the fluid maybe conditioned (i.e. heated or cooled). The fluid supply 12 typically comprises: a reservoir 20 for containing fluid, which in most applications is 1-5 litres of fluid; a fluid pump 22, such as a reciprocating or rotary pump that may be driven by an electrical motor or an induction coil (although in one example the pump may be replaced with connection to a mains water supply); an optional fluid thermal exchanger 24 (typically a heater), which generally comprises an in-line, thermo block type heater; an outlet for supplying the fluid. The reservoir 20, fluid pump 22, fluid heater 24, and outlet are in fluid communication with each other in any suitable order and form a fluid line. The fluid supply 12 may optionally comprise a sensor to measure fluid flow rate and/or the amount of fluid delivered. An example of such a sensor is a flow meter, which may comprises a hall or other suitable sensor to measure rotation of a rotor, a signal from the sensor being provided to the processing subsystem 50 as will be discussed.

Container Processing Subsystem for Extraction of Foodstuff/Beverage from Container According to a first embodiment the container processing subsystem 14 is operable: to receive the container 6 containing material; process the container 6 to extract one or more ingredients of a beverage or foodstuff therefrom, and to dispense the said ingredients into an alternate receptacle for end-user consumption. The container is generally a single-use, single-serving container such as a capsule or packet.

A container processing subsystem 14 for use with the said capsule will initially be described, an example of which is shown in FIG. 1A. The container processing subsystem 14 comprises an extraction unit 26 operable to move between a capsule receiving position and a capsule extraction position. When moving from the capsule extraction position to the capsule receiving position the extraction unit 26 may be moved through or to a capsule ejection position, wherein a spent capsule can be ejected therefrom. The extraction unit 26 receives fluid from the fluid supply 12. The extraction unit 26 typically comprises: an injection head 28; a capsule holder 30; a capsule holder loading system 32; a capsule insertion channel 34A; a capsule ejection channel or port 34B, which are described sequentially.

The injection head 28 is configured to inject fluid into a cavity of the capsule 6 when held by the capsule holder 30, and to this end has mounted thereto an injector, which has a nozzle that is in fluid communication with the outlet of the fluid supply 12.

The capsule holder 30 is configured to hold the capsule 6 during extraction and to this end it is operatively linked to the injection head 28. The capsule holder 30 is operable to move to implement the said capsule receiving position and capsule extraction position: with the capsule holder in the capsule receiving position a capsule 6 can be supplied to the capsule holder 30 from the capsule insertion channel 34A; with the capsule holder 30 in the capsule extraction position a supplied capsule 6 is held by the holder 30, the injection head 28 can inject fluid into the cavity of the held capsule, and one or more ingredients can be extracted therefrom. When moving the capsule holder 30 from the capsule extraction position to the capsule receiving position, the capsule holder 30 can be moved through or to the said capsule ejection position, wherein a spent capsule 6 can be ejected from the capsule holder 30 via the capsule ejection channel or port 34B.

The capsule holder loading system 32 is operable to drive the capsule holder 30 between the capsule receiving position and the capsule extraction position.

The aforedescribed container extraction unit 14 is generally a pressurised extraction unit, e.g. the container is hydraulically sealed and subject to 5-20 bar during brewing. Generally the pump is an induction pump. The extraction unit may alternatively operate by centrifugation as disclosed in EP 2594171 A1, which is incorporated herein by reference.

The container processing subsystem 14 may alternatively or additionally comprise a dissolution unit configured as disclosed in EP 1472156 and in EP 1784344, which are incorporated herein by reference.

In the embodiment of the container 6 comprising a packet the container processing subsystem 14 comprises an extraction and/or dissolution unit operable to receive the packet and to inject, at an inlet thereof, fluid from the fluid supply 12. The injected fluid mixes with material within the packet to at least partially prepare the beverage, which exits the packet via an outlet thereof. The container processing subsystem 14 comprises: a support mechanism to receive an unused packet and eject a spent packet; an injector configured to supply fluid to the packet from the outlet of the fluid supply. Further detail is provided in WO 2014/125123, which is incorporated herein by reference.

Figure 1B:
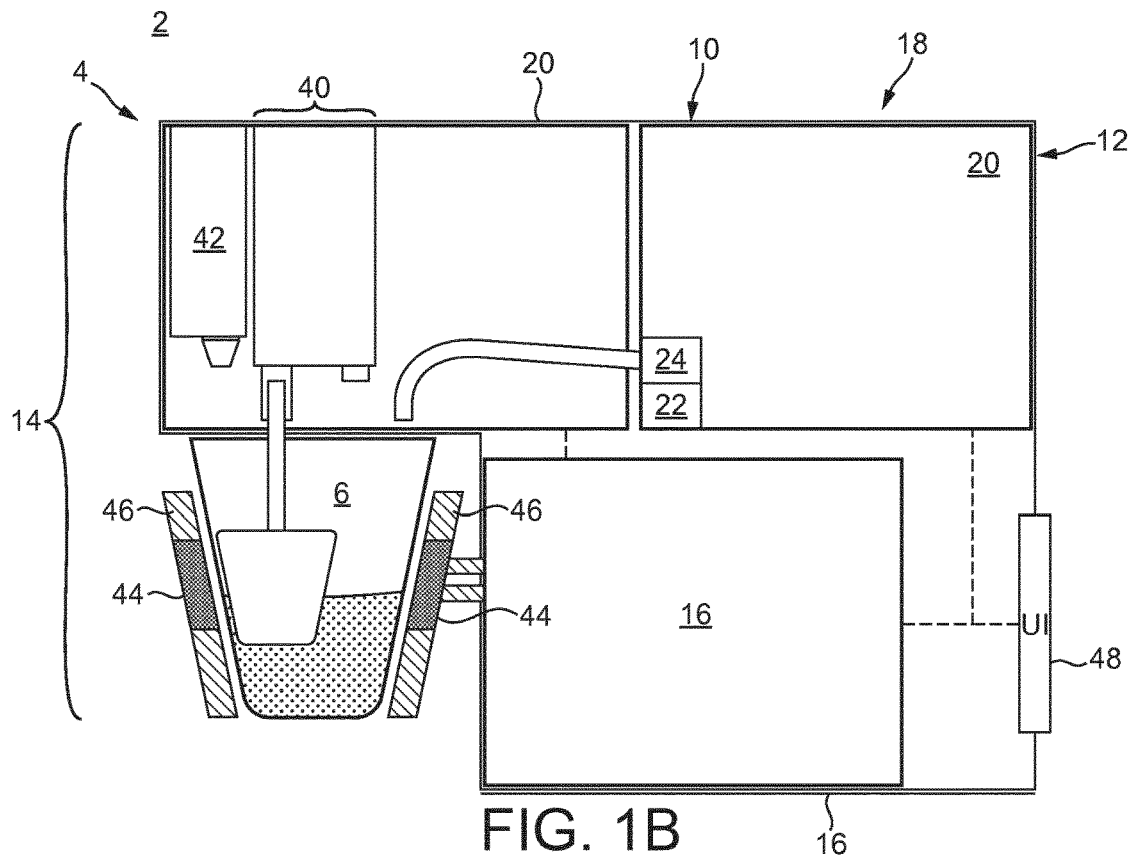

Container Processing Subsystem for Preparation of Foodstuff/Beverage in Container for End User Consumption According to a further embodiment, an example of which is shown in FIG. 1B, the container processing subsystem 14 is generally operable to prepare material stored in a container 6 that is a receptacle, such as a cup, pot or other suitable receptacle configured to hold approximately 150-350 ml of prepared product. Herein the container processing subsystem 14 comprises a mixing unit, which comprises: an agitator unit 40; an optional auxiliary product unit 42; a thermal exchanger 44; and a receptacle support 46, which will be described sequentially.

The agitator unit 40 is operable to agitate material within the receptacle for at least partial preparation thereof. The agitator unit may comprise any suitable mixing arrangement, e.g. a: planetary mixer; spiral mixer; vertical cut mixer. Typically the agitator unit 40 comprises: an implement for mixing having a mixing head for contact with the material; and a drive unit, such as an electric motor or solenoid, to drive the mixing implement. In a preferred example of a planetary mixer the mixing head comprises an agitator that rotates with a radial angular velocity W1 on an offset shaft that rotates with gyration angular velocity W2, such an arrangement is disclosed in PCT/EP2013/072692, which is incorporated herein by reference.

The auxiliary product unit 42 is operable to supply an auxiliary product, such as a topping, to the container 6. The auxiliary product unit 42 for example comprises: a reservoir to store said product; an electrically operated dispensing system to effect the dispensing of said product from the reservoir. Alternatively or additionally, the auxiliary production unit comprises a dilution and/or an extraction unit as described above to effect the dispensing from said auxiliary product from a container 6 such as a packet or a capsule.

The thermal exchanger 44 is operable to transfer and/or extract thermal energy from the container 6. In an example of transfer of thermal energy it may comprise a heater such as thermoblock. In an example of extraction of thermal energy it may comprise heat pump such as a refrigeration-type cycle heat pump.

The receptacle support 46 is operable to support the container 6 during a preparation process such that the container remains stationary during agitation of the material therein by the agitator unit 40. The receptacle support 46 preferably is thermally associated with the thermal exchanger 44 such that transfer of thermal energy can occur with a supported receptacle.

In a variant of the above, the container processing subsystem 14 further comprises a dispensing mechanism for receiving a container 6 (such as a packet or capsule) and dispensing the associated material into the receptacle, where it is prepared. Such an example is disclosed in EP 14167344 A, which is incorporated herein by reference. In a particular embodiment with this configuration the container may be a partially collapsible container, whereby the container is collapsible to dispense material stored therein. Such an example is disclosed in EP 15195547 A, which is incorporated herein by reference. In particular a collapsible portion of the container comprises a geometric configuration and/or portion of weakening such that said portion collapses in preference to a retaining portion upon the application of axial load through both portions. In such an embodiment the container processing subsystem 14 comprises a mechanical actuation device configured to apply an axial load to collapse said container, an example of which is provided in the reference application.

Control Subsystem

Figure 2A:
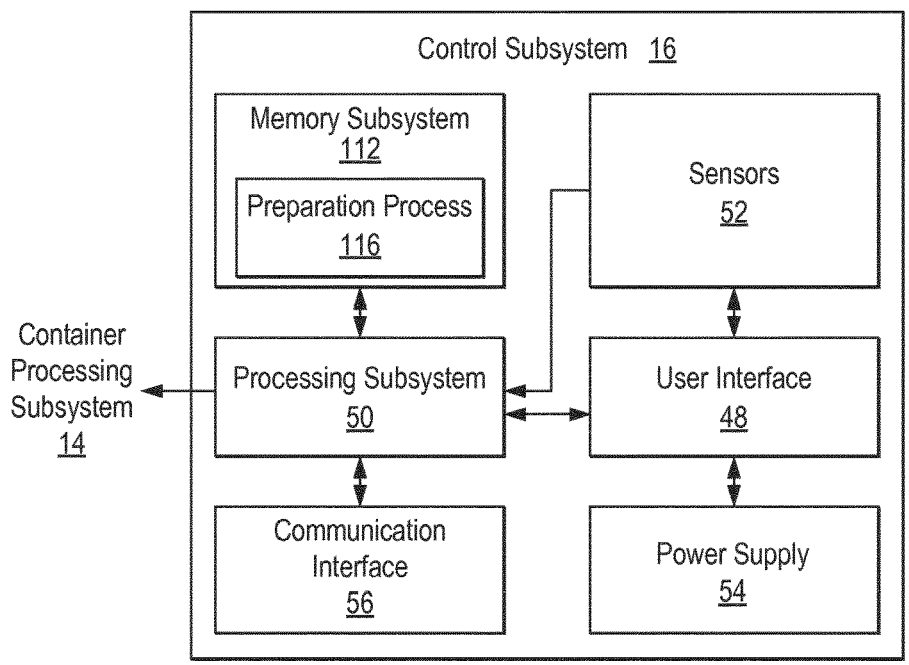
FIG. 2 is a block diagram illustrating a control subsystem and code processing subsystem for the preparation machine of FIG. 1 according to an embodiment of the present disclosure.
Figure 2B:
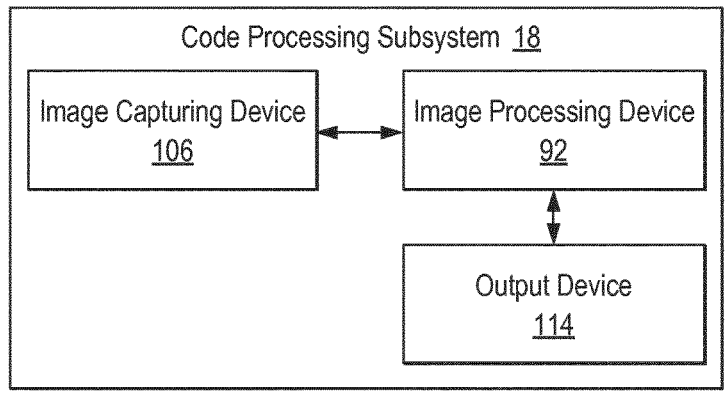

The control subsystem 16, an embodiment of which is illustrated in FIG. 2, is operable to control the container processing subsystem 14 to prepare the beverage/foodstuff. The control subsystem 16 typically comprises: a user interface 48; a processing subsystem 50; optional sensors 52; a power supply 54, optional communication interface 56, which are described sequentially.

The user interface 48 comprises hardware to enable an end user to interface with the processing subsystem 50 and hence is operatively connected thereto. More particularly: the user interface 48 receives commands from a user; a user interface signal transfers the said commands to the processing subsystem 50 as an input. The commands may, for example, be an instruction to execute a preparation process. The hardware of the user interface 48 may comprise any suitable device(s), for example, the hardware comprises one or more of the following: buttons, such as a joystick button or press button; joystick; LEDs; graphic or character LDCs; graphical screen with touch sensing and/or screen edge buttons.

Optional sensors 52 are operatively connected to the processing subsystem 50 to provide an input for monitoring said process. The sensors 52 typically comprise one or more of the following: fluid temperature sensors; fluid level sensors; position sensors e.g. for sensing a position of the extraction unit 26; flow rate and/or volume sensors.

The processing subsystem 50 (which may be referred to as a processor) is generally operable to: receive an input, i.e. said commands from the user interface 48 and/or from the sensors 52 and/or preparation information decoded by the code processing subsystem 18, as explained further below; process the input according to program code stored on a memory subsystem (or programmed logic); provide an output, which is generally the said preparation process. The process may be executed with open-loop control, or more preferably with closed-loop control using the input signal from the sensors 52 as feedback. The processing subsystem 50 generally comprises memory, input and output system components, which are arranged as an integrated circuit, typically as a microprocessor or a microcontroller. The processing subsystem 50 may comprise other suitable integrated circuits, such as: an ASIC; a programmable logic device such as an FPGA; an analogue integrated circuit such as a controller. The processing subsystem 50 may also comprise one or more of the aforementioned integrated circuits, i.e. multiple processors.

The processing subsystem 50 generally comprises or is in communication with a memory subsystem 112 (which may be referred to as a memory unit) for storage of the program code and optionally data. The memory subsystem 112 typically comprises: a non-volatile memory e.g. EPROM, EEPROM or Flash for program code and operating parameter storage; volatile memory (RAM) for data storage. The program code typically comprises a preparation program 116 executable to effect a preparation process. The memory subsystem may comprise separate and/or integrated (e.g. on a die of the processor) memory.

The power supply 54 is operable to supply electrical energy to the processing subsystem 50, container processing subsystem 14, and the fluid supply 12 as will be discussed. The power supply 54 may comprise various means, such as a battery or a unit to receive and condition a mains electrical supply.

The communication interface 56 is for data communication between the preparation machine 4 and another device/system, typically a server system. The communication interface 56 can be used to supply and/or receive information related to the preparation process, such as container consumption information and/or preparation process information. The communication interface 56 can be configured for cabled media or wireless media or a combination thereof, e.g.: a wired connection, such as RS-232, USB, I²C, Ethernet defined by IEEE 802.3; a wireless connection, such as wireless LAN (e.g. IEEE 802.11) or near field communication (NFC) or a cellular system such as GPRS or GSM. The communication interface 56 is operatively connected to the processing subsystem 50. Generally the communication interface comprises a separate processing unit (examples of which are provided above) to control communication hardware (e.g. an antenna) to interface with the master processing subsystem 50. However, less complex configurations can be used e.g. a simple wired connection for serial communication directly with the processing subsystem 50.

Code Processing Subsystem

The code processing subsystem 18 is operable: to obtain an image of a code on the container 6; to process said image to decode the encoded information including for example preparation information. The code processing subsystem 18 comprises an: image capturing device 106; image processing device 92; output device 114, which are described sequentially.

The image capturing device 106 is operable to capture a digital image of the code and to transfer, as digital data, said image to the image processing device 92. To enable the scale of the digital image to be determined: the image capturing device 106 is preferably arranged a predetermined distance away from the code when obtaining the digital image; in an example wherein the image capturing device 106 comprises a lens the magnification of the lens is preferably stored on a memory of the image processing device 92. The image capturing device 106 comprises any suitable optical device for capturing a digital image consisting of the latter discussed micro-unit code composition. The code forming a micro-unit composition, the image capturing device may have very small dimensions, for example in the magnitude of a few millimetres or less, for example less than 2 mm in length, width and thickness, thereby facilitating its integration in a foodstuff/preparation machine 4, for example in the container processing subsystem 14. Such image capturing devices are furthermore mechanically simple and reliable pieces of equipment that will not impair the machine's overall functional reliability. Examples of suitable reliable optical devices are: Sonix SN9S102; Snap Sensor S2 imager; an oversampled binary image sensor.

The image processing device 92 is operatively connected to the image capturing device 106 and is operable to process said digital data to decode information, in particular preparation information encoded therein. Processing of the digital data is discussed in the following. The image processing device 92 may comprise a processor such as a microcontroller or an ASIC. It may alternatively comprise the aforesaid processing subsystem 50, in such an embodiment it will be appreciated that the output device is integrated in the processing subsystem 50. For the said processing the image processing device 92 typically comprises a code processing program. An example of a suitable image processing device is the Texas Instruments TMS320C5517.

The output device 114 is operatively connected to the image processing device 92 and is operable to output digital data that comprises the decoded information to the processing subsystem 50, e.g. by means of a serial interface.

Container

The container 6 may comprise, depending on the embodiment of the container processing subsystem 14, a: receptacle comprising material for preparation and end-user consumption therefrom; a capsule or packet comprising material for preparation therefrom. The container 6 may be formed from various materials, such as metal or plastic or a combination thereof. In general the material is selected such that it is: food-safe; it can withstand the pressure and/or temperature of the preparation process. Suitable examples of containers are provided following.

The container 6 when not in packet form generally comprises: a body portion 58 defining a cavity for the storage of a dosage of a material; a lid portion 60 for closing the cavity; a flange portion 62 for connection of the body portion and flange portion, the flange portion generally being arranged distal a base of the cavity. The body portion may comprise various shapes, such as a disk, frusto-conical or rectangular cross-sectioned. Accordingly, it will be appreciated that the capsule 6 may take various forms, an example of which is provided in FIG. 3A, which may generically extend to a receptacle or capsule as defined herein. The container 6 may be distinguished as a receptacle for end-user consumption therefrom when configured with an internal volume of 150-350 ml and preferably a diameter of 6-10 cm and axial length of 4-8 cm. In a similar fashion a capsule for extraction may be distinguished when configured with an internal volume of less than 100 or 50 ml and preferably a diameter of 2-5 cm and axial length of 2-4 cm. The container 6 in collapsible configuration may comprise an internal volume of 5 ml-250 ml. In embodiments, the container's cavity may be divided in a plurality of compartments, for example two, three or more compartments, each compartment containing a material possibly different from the material contained in the other compartments. The different materials of the various compartments may for example be processed simultaneously or sequentially by the container processing subsystem 14. Examples of such containers and their processing by an appropriate container processing subsystem are for example described in WO 2007/054479 A1, WO 2014/057094 A1 and unpublished application EP 17151656.0, which are all incorporated herein by reference.

Figure 3A:
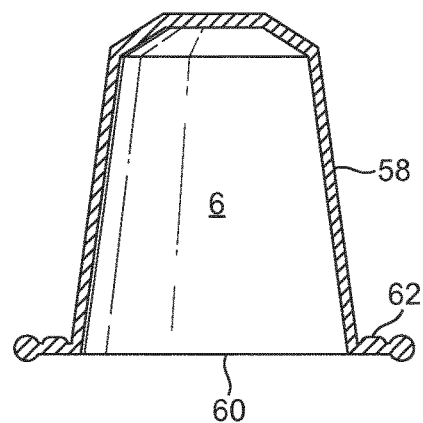
FIG. 3 is diagrammatic drawing illustrating containers for the preparation machine of FIG. 1 according to an embodiment of the present disclosure.
Figure 3B:
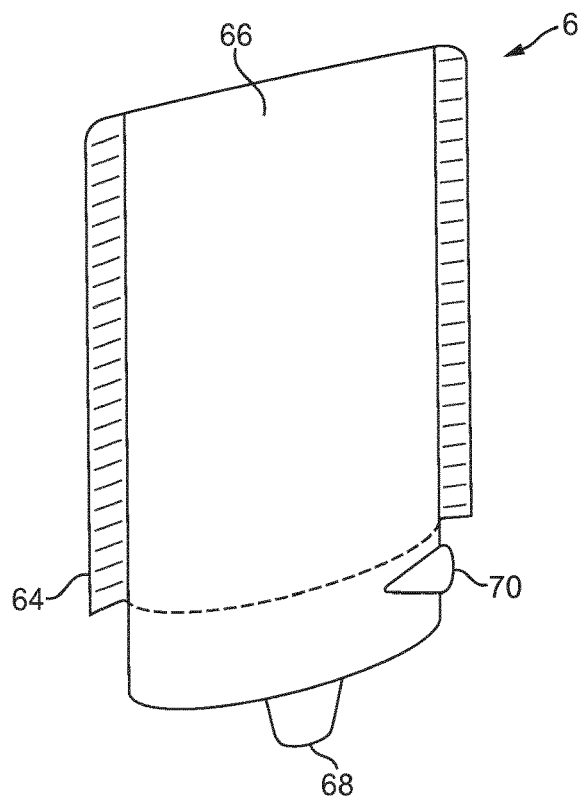

The container 6 when in packet form as shown in FIG. 3B generally comprises: an arrangement of sheet material 64 (such as one or more sheets joined at their periphery) defining an internal volume 66 for the storage of a dosage of a material; an inlet 68 for inflow of fluid into the internal volume 66; an outlet 70 for outflow of fluid and material from the internal volume. Typically the inlet 68 and outlet 70 are arranged on a body of an attachment (not shown), which is attached to the sheet material. The sheet material may be formed from various materials, such as metal foil or plastic or a combination thereof. Typically the internal volume 66 may be 150-350 ml or 200-300 ml or 50-150 depending on the application. In embodiments, the internal volume of the container may be divided in a plurality of compartments, for example two or three compartments, each compartment containing a material possibly different from the material contained in the other compartments. The different material of the various compartments may for example be processed simultaneously or sequentially by an appropriate container processing subsystem 14.

Information Encoded by Code

A code 74 of the container 6 encodes preparation information, which generally comprises information related to the associated preparation process. Depending on the embodiment of the container processing subsystem 14 said information may encode one or more parameters, which may comprise one or more of a: fluid pressure; fluid temperature (at container inlet and/or outlet to receptacle); fluid mass/volumetric flow rate; fluid volume; phase identifier, for when a preparation process is split into a series of phases, whereby each phase comprises a set of one of more of the aforesaid parameters, (typically there are 4-10 phases); phase duration (e.g. a duration for applying the parameters of a phase); recipe and/or container and/or compartment identifier, for when a recipe requires processing material contained in two or more containers and/or container compartments; container geometric parameters, such as shape/volume/number of different ingredient compartments; other container parameters e.g. a container identifier, which may for example be used to monitor container consumption for the purpose of container re-ordering, an expiry date, a recipe identifier, which may be used to lookup a recipe stored on the memory of the beverage machine for use with the container.

Specifically in respect of a preparation machine 4 such as the one illustrated in FIG. 1A said encoded parameters may comprise any one or more of a: pressure; temperature; fluid volume; fluid flow rate; time of a particular phase of preparation for which the aforesaid one or more parameters are applied for; phase identifier, e.g. an alphanumeric identifier, to identify which of a plurality of phases the aforesaid one or more parameters relate; recipe identifier; pre-wetting time, which is the amount of time the material of the container may be soaked for during an initial preparation phase; pre-wetting volume, which is the amount of fluid volume applied during said phase.

Specifically in respect of a preparation machine 4 such as the one illustrated in FIG. 1B said encoded parameters may comprise one or more of a: percentage cooling or heating power to apply (e.g. the power applied by the thermal exchanger 44); torque applied by the agitator unit 40; one or more angular velocities (e.g. a gyration and radial angular velocities W1, W2); container temperature (e.g. the temperature set by the thermal exchanger 44); time of a particular phase of preparation for which the aforesaid one or more parameters are applied for; phase identifier, e.g. an alphanumeric identifier, to identify which of a plurality of phases the aforesaid one or more parameters relate.

Arrangement of Code

The code is arranged on an exterior surface of the container 6 in any suitable position such that it can be processed by the code processing subsystem 18. In the afore-discussed example of a receptacle/capsule 6, as shown in FIG. 3A, the code can be arranged on any exterior surface thereof, e.g. the lid, body or flange portion. In the afore-discussed example of a packet 6, as shown in FIG. 3B, the code can be arranged on any exterior surface thereof, e.g. either or both sides of the packet, including the rim.

A plurality of codes can be formed on the container 6, e.g.: for read error checking; and/or with separate phases of a preparation process encoded by each code. In particular the planform of the code (as will be discussed) may comprise an at least partially tessellating shape, e.g. a rectangle such as a square, whereby the codes are formed on a container in an at least partially tessellating manner (e.g. a grid with adjacent columns aligned or with adjacent columns offset).

Composition of Code

The code 74, and example of which is shown in FIG. 4, is configured to encode the preparation information in a manner for capturing by the image capturing device 106. More particularly, the code is formed of a plurality of units 76, preferably micro units, with a surround of a different colour: typically the units comprise a dark colour (e.g. one of the following: black, dark blue, purple, dark green) and the surround comprises a light colour (e.g. one of the following: white, light blue, yellow, light green) or the converse, such that there is sufficient contrast for the image processing device 92 to distinguish therebetween. The units 76 may have one or a combination of the following shapes: circular; triangular; polygon, in particular a quadrilateral such as square or parallelogram; other known suitable shape. It will be appreciated that due to formation error, (e.g. printing error), the aforesaid shape can be an approximation of the actual shape. The units 76 typically have a unit length of 50-200 µm (e.g. 60, 80, 100, 120, 150 µm). The unit length is a suitably defined distance of the unit, e.g.: for a circular shape the diameter; for a square a side length; for a polygon a diameter or distance between opposing vertices; for a triangle a hypotenuse. The units 76 are preferably arranged with a precision of about 1 µm.

Whilst the code is referred to as comprising a plurality of units it will be appreciated that the units may alternatively be referred to as elements or markers.

Typically the units 76 are formed by: printing e.g. by means of an ink printer; embossing; engraving; other known means. As an example of printing, the ink may be conventional printer ink and the substrate may be: polyethylene terephthalate (PET); aluminium coated with a lacquer (as found on Nespresso™ Classic™ capsules) or other suitable substrate. As an example of embossing the shape may be pressed into a plastically deformable substrate (such as the aforesaid aluminium coated with a lacquer) by a stamp. The costs of forming the code on a container 6 may thus be kept low by using conventional and inexpensive technologies (e.g. ink-jet, off-set, or laser printing), such that the costs of forming the code don't significantly impact the costs of production of the container 6.

The code comprises a planform 104, within which the units 76 are arranged. The planform may be circular or rectangular (as shown in FIG. 4). Typically the planform has a length (i.e. a diameter for a circular planform and a side length for a square planform) of 600-1600 µm, or about 1100 µm, which will depend on the number of parameters encoded. The code 74 of the invention allows encoding several parameter values on a small surface, thereby allowing potentially encoding all parameters necessary for the completion of complex recipes by a beverage or foodstuff preparation machine according to the fourth embodiment of the invention. The code 74 for example allows encoding preparation information required for recipes comprising several processing phases using the foodstuff contained in one or more containers and/or container compartments.

The units 76 are organised into a: data portion 78 to encode the preparation information; and a reference portion 80 to provide a reference for the data portion 78, both of which are described in more detail following.

The reference portion 80 comprises a plurality of reference units 86 defining a reference point and a linear reference line r extending from the reference point. The reference line r provides a reference direction for angular reference by the data portion 78 as will be discussed. One or a plurality of the reference units 86 generally define a reference line r orientation identifier 88, which is identified to determine the orientation of said line and will be discussed.

The data portion 78 comprises a data unit 82 arranged on an encoding line D that intersects the reference line r. The encoding line D is circular and is arranged with a tangent thereto orthogonal the reference line r at said intersection point. The axial centre of the encoding line D preferably coincides with the reference point associated with the angular reference of the reference line r. Generally the data unit, for example exactly one data unit 82, is able to occupy any continuous distance d along the encoding line D from its intersection with the reference line r, as a variable to encode a parameter of the preparation information. In this respect a wider range of information may be encoded. The continuous encoding of a parameter is particular advantageous in encoding parameters which can have a large numerical range, e.g. torque and angular velocity. Alternatively, the data unit 82 can only occupy one of a plurality of discrete positions only (i.e. one of a plurality of predetermined positions) along the encoding line D as a variable to encode the parameter.

The data portion 78 of the code further comprises a plurality of discrete positions 102 arranged in operative proximity to the reference line r such that they can be located using the reference line r. The discrete positions 102 are not the encoding line D. The discrete positions 102 either comprise or do not comprise a data unit 82 as will be discussed. Preferably, only the reference units 86 and the data units 82 are physically formed, e.g. printed or embossed, on the container or code support.

The encoding along the encoding line D and encoding of the discrete positions 102 is discussed in more detail sequentially.

Encoding Along Encoding Line D

The code 74, an example of which is shown in FIG. 4, comprise the aforesaid arrangement of the encoding line D and reference line r. Note in FIG. 4 (and those following) the: reference line r, encoding line D; planform 104; encoding area 90; and various other constructional lines, are shown for illustrative purposes only, that is to say they do not require physical formation as part of the code. Rather they can be defined virtually when an image of the code is processed as will be discussed.

The encoding line D intersects the reference line r at a reference position 84. A reference position 84 may or may not comprise a reference unit 86 as will be discussed. Generally there are plurality of encoding lines D, such as 2, 3, 4, 5, which are concentrically arranged and intersect the reference line r at a plurality of different reference positions 84, whereby each has a data unit at least partially encoding a parameter. The data portion 78 generally comprises an encoding area 90, which is defined by the encoding lines D, within the bounds of which the data units 82 are arranged.

Numbering of the reference positions 84 and the associated data units 82 and encoding line D herein is denoted by a numerical subscript, and comprises the lowest number reference position 84 proximate the orientation identifier 88 (which will be discussed), increasing consecutively to the highest number reference position 84 distal thereto, e.g. the second reference position is $84_2$, the associated encoding line is $D_2$ and distance is $d_2$ as shown in FIG. 4.

The distance d is defined from the reference position 84 along the encoding line D to a position on the encoding line D, which a centre of the data unit 82 is arranged on, or arranged proximate thereto, e.g. at a position on the encoding line D which is intersected by a line through the centre of the data unit 82, whereby said line is orthogonal to the encoding line D at the point of intersection. The distance d may be defined in terms of the circumferential or angular distance.

Figure 4A:
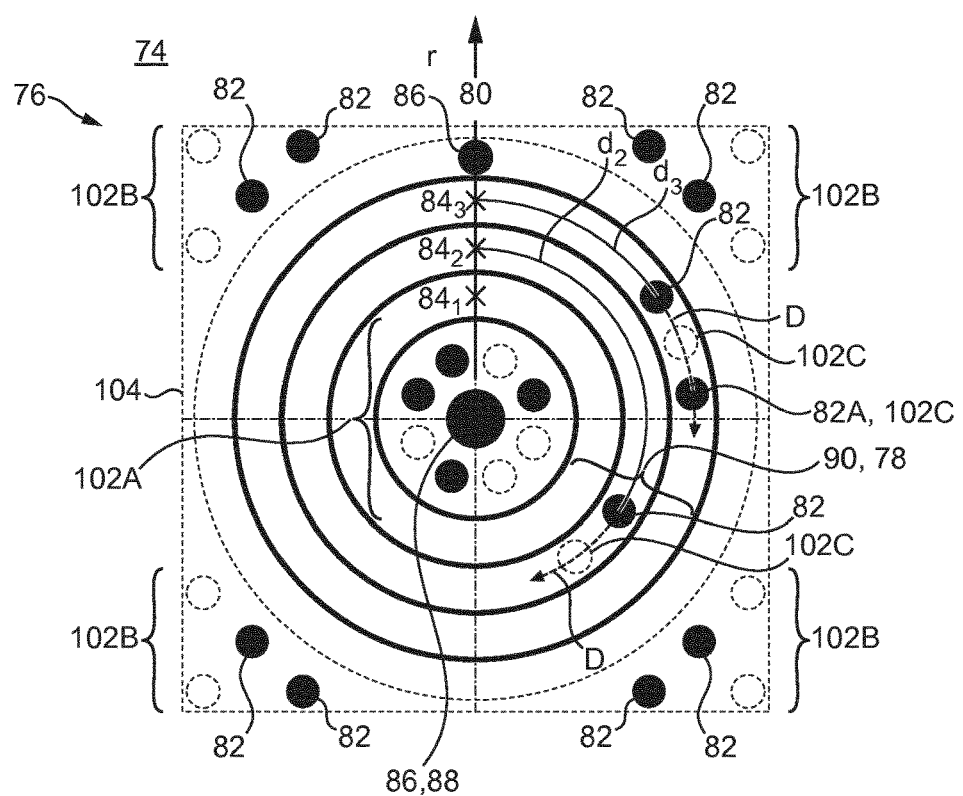
FIGS. 4-5 are plan views showing to scale codes for the containers of FIG. 3 according to an embodiment of the present disclosure.

The reference portion 80 comprises m reference units 86, (two are illustrated in FIG. 4A) arranged to define a linear reference line r, wherein m numerically is at least two. In particular the reference line r extends through a plurality of points which are defined either by a reference unit or a by plurality of reference units as will be discussed.

One or a plurality of the reference units 86 define the optional reference line orientation identifier 88, which enables determination of the orientation of the reference line r and associated reference positions 84, e.g. each reference position 84 is a predetermined distance (such as 100-200 µm or 160 µm) along the reference line r from the orientation identifier 88. Generally the reference line r extends from a reference point defined by the orientation identifier 88. Generally the orientation identifier is arranged with the reference point at a centre of the circle defined by the encoding lines D. In examples not comprising said orientation identifier the reference point may be identified as: a portion at the end of the reference line r, which can be defined by a plurality of same reference units; and/or as point without an associated encoding line D that has a data unit arranged thereon and that intersects said reference unit.

The orientation identifier may comprise a single reference unit, an example of which is shown in FIG. 4A, whereby the aforesaid reference point is generally at the centre of the reference unit. The orientation identifier 88 may be identifiable as one or a combination of a different shape, colour, size from the other units that comprise the code. As illustrated, the reference unit for example comprises a different size to the other units of the code, (e.g. it has a diameter of 120 µm and the other units are 60 µm. Advantageously it is convenient for a processor to determine an orientation of the reference line r, moreover, since an encoding line D cannot be arranged at the axial centre, the planform comprising the code is efficiently utilised.

Preferably, the orientation identifier comprises a plurality of reference units, whereby each reference unit of the plurality of reference units is the same (i.e. in shape, colour and size) as the other units of the code. In particular the reference units that comprise the reference unit orientation identifier are arranged with a configuration defining the aforesaid reference point. Said configuration generally comprises a 2 dimensional polygon with the reference units arranged at the vertices and said reference point at the centre, preferably with equal side lengths. The polygon may be one selected from a group comprising: a triangle; square; pentagon; hexagon; heptagon; octagon. In the example shown in FIG. 4B the polygon is an equilateral triangle with three reference units arranged at its vertices and said reference point at its centre. In a preferred embodiment, the polygon is a right-angled triangle, wherein the reference units at the vertices of the triangle are located on a virtual circle centred on the reference point of the code. The virtual circle is preferably located outside an encoding area of the code, close to the centre of the annular encoding area. The reference line r for example extends from the reference point defined by the reference units, and its orientation is determined parallel to a specific side of the triangle, for example parallel to the upright portion of the "L" formed by the reference units. It is advantageous to have all of the units of the code the same since the complexity of processing the code is reduced. In particular, a computer program only has to determine the presence of a unit and its centre, as opposed to discriminated between different sizes, shapes and/or colours. Consequently a more cost effective processor can be utilised in the beverage or foodstuff preparation machine.

In embodiments, the reference line r is comprised of the orientation identifier 88 and a further reference unit 86. The centre of the further reference unit defines a point through which the reference line r extends. The further reference unit is identifiable by one or more of the following: its arrangement at a greater radial position from the orientation identifier 88 (i.e. from its aforesaid point) than the data units 82; its arrangement at a predetermined reserved radial position from the orientation identifier 88, whereby the data units are not arranged at said predetermined radial position; and it is distinct from the other units that comprise the code in terms of one of more of the following: shape, size, colour. The reference line r and its orientation can thus be determined by locating the orientation identifier 88 and a further reference unit 86.

The reference line r may be arranged a predetermined minimum distance away from the encoding area 90 of the data portion 78, e.g. by 50 µm-150 µm or 100 µm, to ensure adequate separation of the reference units 86 and data units 82, i.e. a radially extending portion is cut from its annular shape. Such an example is preferable when the reference positions comprise reference units 86.

Alternatively, as shown in the illustrated example, the reference line r extends through the encoding area 90, i.e. it radially intersects its annular shape.

The data portion 78 generally comprises an encoding area 90 which is annular whereon the data units 82 thereof are arranged, whereby the reference line r extends radially from a centre of the annular encoding area 90. The encoding lines D are concentrically arranged and extend from the reference line r about the centre of the annular encoding area 90. A point of intersection between the encoding line D and reference line r is locally orthogonal and defines the reference position 84. Each data unit 82 may have a corresponding reference unit 86 at the associated reference position 84. Advantageously the reference positions are easy to locate. Alternatively (as shown in the figure) preferably the reference position 84 does not have a reference unit 86, whereby the reference position 84 is defined virtually on the reference line r, e.g. it is interpolated by a predetermined distance from an adjacent reference unit 86 or from the reference point. Advantageously the data units can be arranged in closer proximity to the reference line r.

More than one data unit 82 can be arranged along an encoding line D, e.g. so that multiple parameters are encoded on an encoding line D or so that each parameter has multiple values associated therewith, examples of which will be provided. A value of a parameter is encoded by the circumferential distance d of the data unit 82 from its associated reference position 84.

To ensure adequate spacing between data units on adjacent encoding lines, the optional block shaded regions arranged co-axial the encoding lines D define bounds of positions of associated data units 82. The block shaded regions are shown for illustrative purposes only, that is to say they do not require physical formation as part of the code, rather they can be defined virtually when an image of the code is processed as will be discussed.

Generally a data unit 82 can be arranged on the associated encoding line D any position up to but not extending over the reference position 84, i.e. up to 360° from the reference line r.

Encoding of Metadata

Each data unit 82 arranged on the encoding line D optionally encodes metadata about an associated parameter. The metadata is generally encoded discretely, i.e. it can only assume certain values. Various examples of encoding the metadata are given following.

Figure 5A:
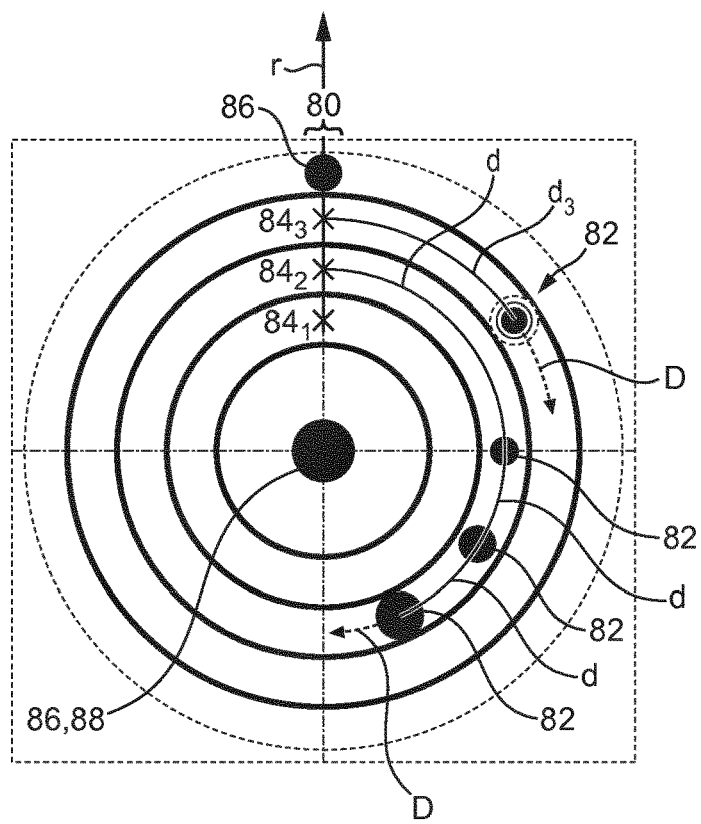

In a first embodiment, an example of which is illustrated in FIG. 5A, the metadata is encoded as a characteristic size (e.g. the size defined by the above-defined unit length or area) of the data unit 82, the size being identifiable as a variable by the image processing device 92. Particularly, the size may be one of a list of 2 or 3 or 4 particular sizes, e.g. selected from a length of 60, 80, 100, 120 µm. In a particular example, which is best illustrated for the data unit 82 associated with the third reference position 84₃, the size of the data unit 82 may be one of three sizes. In a particular example, which is illustrated in association with the second reference position 84₄, there are three parameters encoded (hence three data units), the data unit 82 of each parameter being identifiable by the metadata of the three different sizes of the data units 82.

Figure 5B:
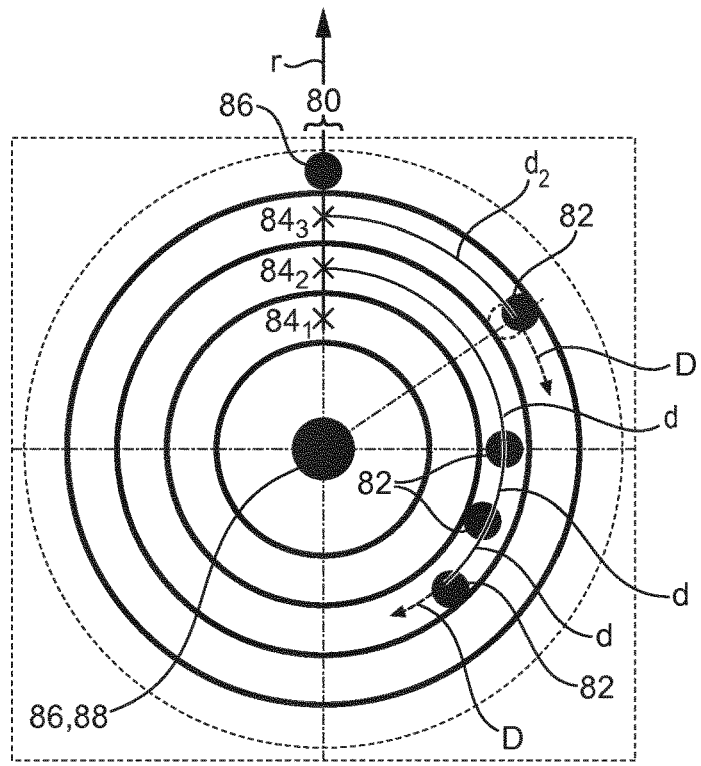

In a second embodiment, an example of which is illustrated in FIG. 5B, the metadata is encoded as a characteristic position of the data unit 82 with respect to an offset of said data unit 82 along an offset line which extends in a direction orthogonal to the encoding line D (i.e. a radial distance and/or a distance orthogonal to a tangent drawn from the encoding line D to the centre of the data unit 82). In spite of said offset the encoding line D still intersects the data unit 82. In particular: the data unit 82 may be offset in a first or second position with respect to the encoding line D to encode two values of the metadata; the data unit 82 may be offset in the first or second position or arranged in a third position on the encoding line D to encode three values of the metadata. The first and second position may be defined by a centre of the data unit 82 arranged a particular distance away from the encoding line D, e.g. at least 20 µm. The third position may be defined by a centre of the data unit 82 arranged less than a particular distance away from the encoding line D, e.g. less than 5 µm. In a particular example, which is illustrated in association with the third reference position 84₃, the data unit 82 may be in a first or second position to encode the metadata. In a particular example, which is illustrated in association with the second reference position 84₂, there are three parameters encoded (hence three data units), the data unit 82 of each parameter being identifiable by the metadata of the position of the data units 82.

Figure 5C:
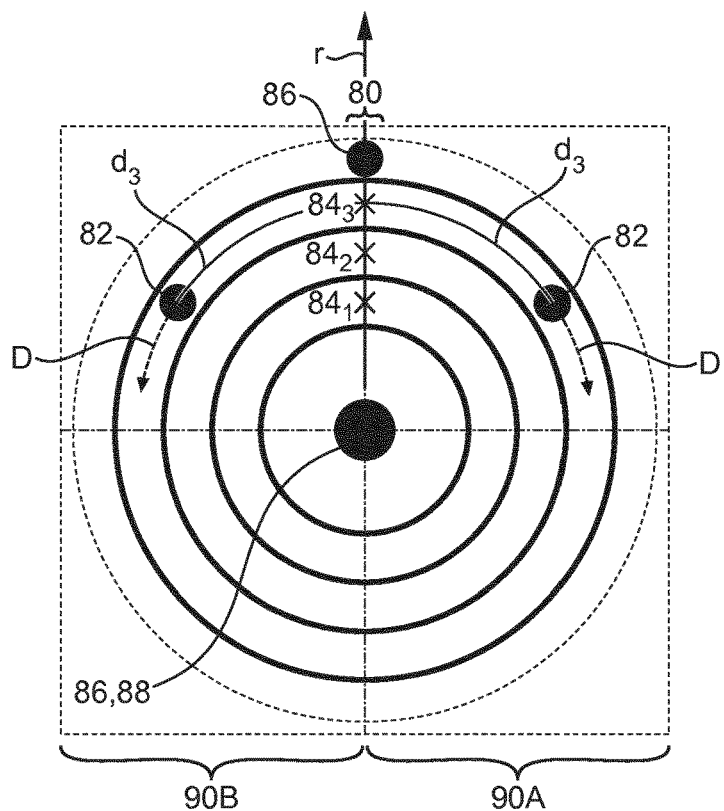

In a third embodiment, an example of which is illustrated in FIG. 5C and referring to the third reference position 84₃, the metadata is encoded as a characteristic position of one or two data units 82 with respect to their arrangement on either side of the reference line r. As examples: a data unit 82 on the left of the reference line r may encode a negative value of the parameter and a data unit 82 one the right of the reference line r may encode a positive value of the parameter or the converse arrangement; for the same parameter a data unit 82 on the left of the reference line r may encode a mantissa, a data unit 82 one the right of the reference line r may encode an exponent or the converse arrangement; a data unit 82 on the left of the reference line r may encode the same parameter as that on the right such that an average can be taken for enhanced accuracy. In this embodiment the encoding area 90 is preferably separated into two distinct semi-circular sub-sections 90A, 90B each having an associated data unit 82 arranged therein, e.g. the maximum distance d for either is on the portion of the reference line r common to the second and third quadrants (or proximal thereto such that two data units are not arranged coincident).

Figure 5D:
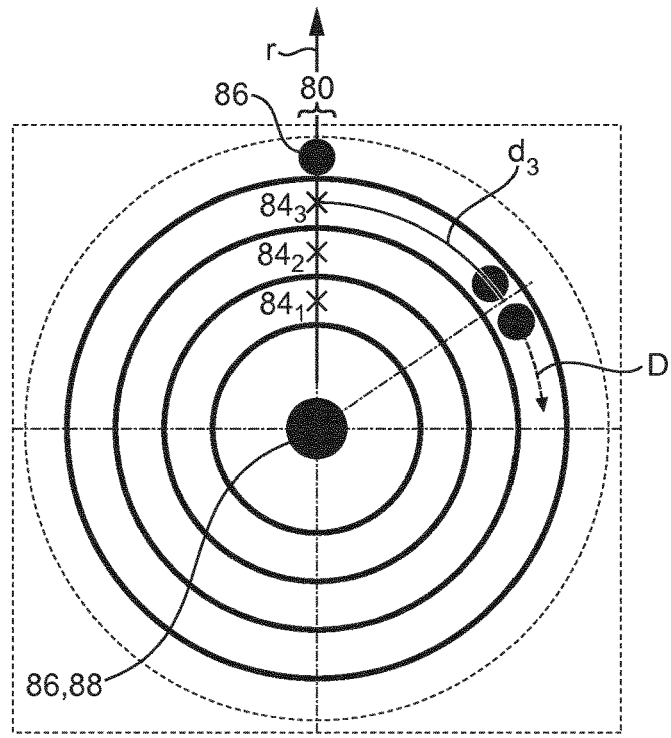

In a fourth embodiment, an example of which is illustrated in FIG. 5D and referring to the third reference position 84$_3$, metadata is encoded as a plurality of data units 82 arranged along the same encoding line D, each with a different associated distance $d_n$. Advantageously an overall distance d can be determined with increased accuracy as a function (typically an average) of the distances $d_n$. In the illustrated example two data units 82 are shown wherein $d=0.5(d_1+d_2)$.

In a fifth embodiment (not shown) the metadata is encoded as a characteristic shape. For example the shape may be one of a list of: circular; triangular; polygon. In a sixth embodiment (not shown) the metadata is encoded as a characteristic colour. For example the colour may be one of a list of: red; green; blue, suitable for identification by an RGB image sensor.

The first-sixth embodiments may be suitably combined, e.g. an encoded parameter may have metadata encoded with a combination of the first and second embodiment.

Figure 5E:
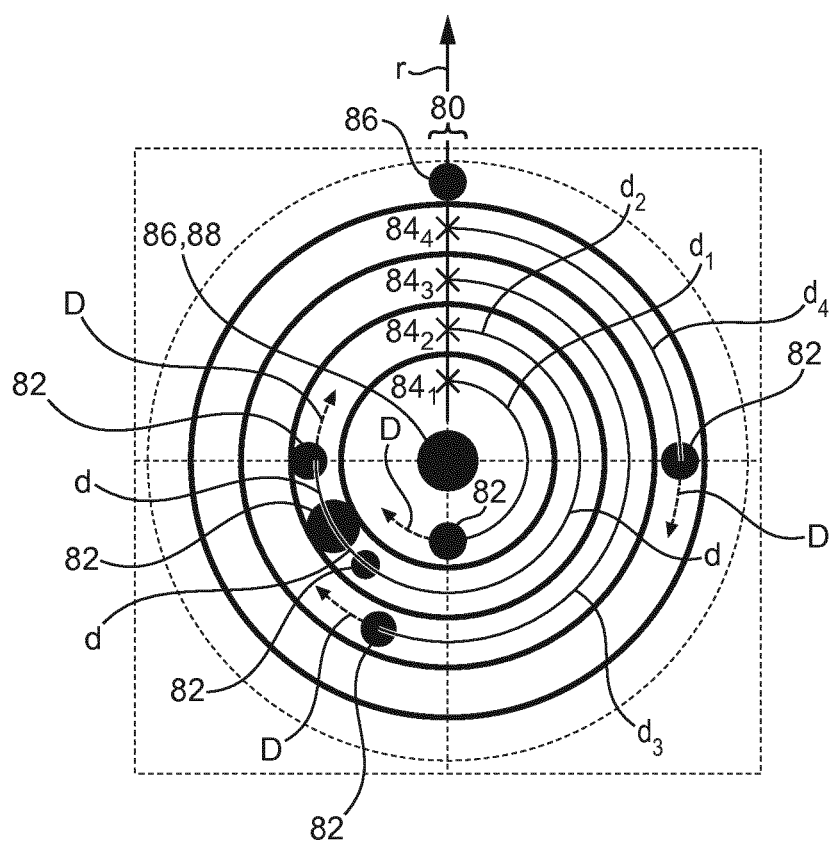

A specific example of the code 74 for use with the second embodiment container processing subsystem 14, is illustrated in FIG. 5E, wherein: the first 84$_1$, third 84$_3$ and fourth 84$_4$ reference positions 86 have associated therewith a data unit 82 that encodes a parameter without any metadata the; second reference position 84$_2$ has three data units 82, each encoding a parameter, the parameter having metadata encoded according to a combination of the first and second embodiment (i.e. 3 values for the size of the unit and 3 values for the position of the unit, hence a total of 9 possible values of the metadata).

In particular: the first reference position 84 encodes a percentage cooling power to apply; the third and fourth reference positions 84 encode either of the radial angular velocity W1 and the gyration angular velocity W2; the second reference position encodes time, temperature, torque as the respective small, medium and large data units in particular positions, whereby these parameters represent triggers such that when a condition set by one of them is achieved then the phase encoded by the code 74 is compete.

Encoding of the Discrete Positions

Figure 4B:
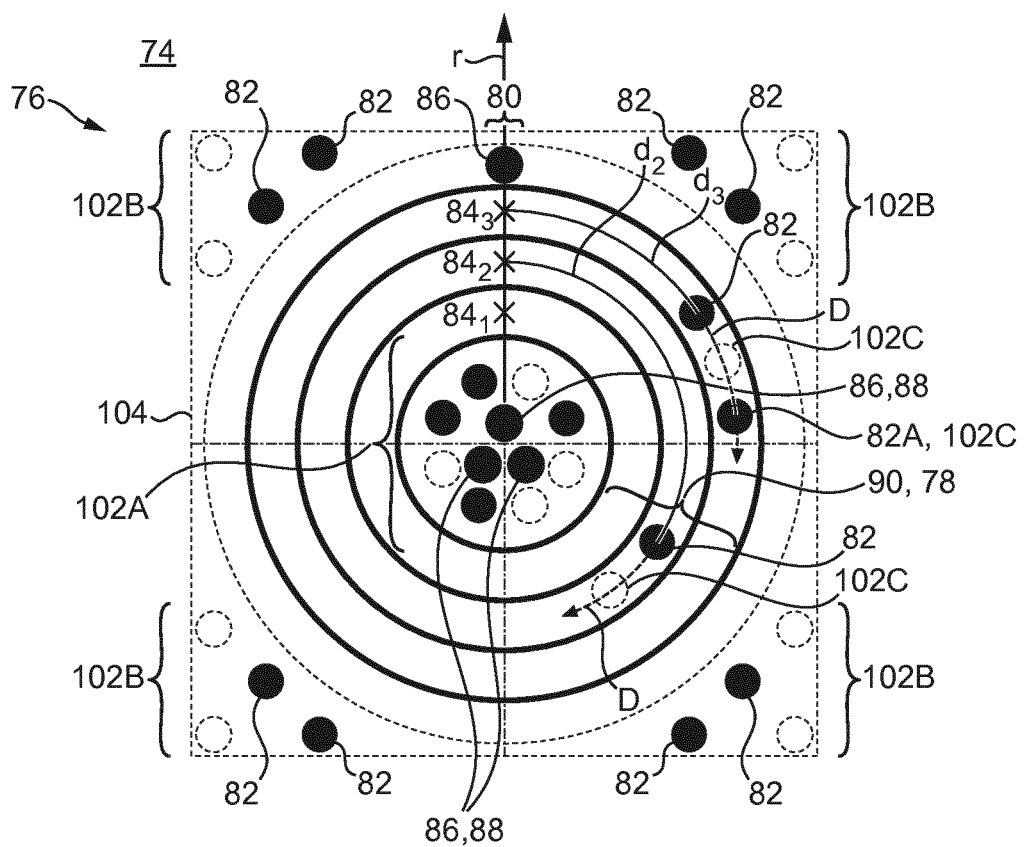

In FIGS. 4A and 4B the discrete positions 102 are shown for illustrative purposes only, that is to say they do not require physical formation as part of the code, rather they can be defined virtually when an image of the code is processed as will be discussed. The discrete positions 102 may be arranged in various locations, which are discussed following.

In a first embodiment, as illustrated in the non-limiting examples of FIGS. 4A and 4B, the discrete positions 102A are arranged at an inner periphery of one or more encoding line(s) D, proximal an axial centre thereof. There may be one or a plurality of the discrete positions 102A, e.g. any number up to 20. In the illustrated example there are 8 discrete positions 102A. Moreover, the discrete positions 102A can be circumferentially disposed, with adjacent positions equidistant each other, about one or more circular lines which are concentric the encoding line(s) D. In the illustrated example they are arranged on one such circular line. Alternatively the discrete positions 102 can have an arbitrary arrangement.

In a second embodiment, as illustrated in the non-limiting examples of FIGS. 4A and 4B, the discrete positions 102B can be arranged at an outer periphery of the encoding line(s) D, distal an axial centre thereof. There may be one or a plurality of the discrete positions 102B, e.g. any number up to 40. In the illustrated example there are 16 discrete positions 102B. Moreover, the discrete positions 102B can be circumferentially disposed, with adjacent positions equidistant each other (not shown), about one or more circular lines which are concentric the encoding line(s) D. Alternatively the discrete positions 102 can have an arbitrary arrangement.

In a particular variant of the second embodiment, wherein the code 74 comprises a rectangular planform 104, the discrete positions 102B can be arranged proximal one or more of the vertices of said planform 104. In particular they may be arranged symmetrically about diagonals between the vertices. In the illustrated example there are four such discreet positions 102B at each vertex. Alternatively the discrete positions 102 can have an arbitrary arrangement.

In a third embodiment, as illustrated in the non-limiting examples of FIGS. 4A and 4B, the discrete positions 102C may be arranged on the encoding line D. They may in particular be arranged proximal the data unit 82 on the encoding line D, for example, at a greater or lesser distance d. There may be plurality of such discrete positions 102C, such as 1 or 2 (as shown) or any number up to 10 or 20. Generally, said positions 102C are arranged at predetermined distances from the data unit, whereby said predetermined distances are stored on a memory. In this way the data unit 82 on the encoding line can be located, and using said location the predetermined positions 102C checked for a further data unit 82A. The predetermined distance may for example be a length of the data unit between the peripheral gap between adjacent units or another suitable distance such that the data units do not overlap.

The code 74 may comprise combinations of one or more of the first, second and third embodiment arrangements of the discrete positions 102 (shown in FIG. 4A, 4B). The arrangement of the discrete positions may be stored on a memory of the machine, typically in respect of the reference line r.

The discrete positions are particular advantageous in encoding parameters that can only assume particular values, e.g. one or more of a phase number, expiry date, container identifier. As an example of the encoding, there are n discrete positions 102 each encoding a bit by the absence or presence of a data unit 82. Hence for: three encoding positions 102 there are $2^3$, i.e. 8 variables; four encoding positions 102 there are $2^4$, i.e. 16 variables. The aforesaid variables can be used to encode: a particular number of phases, e.g. 8 or 16 phases; an expiry date, e.g. 12 variables for a month and a suitable number of variables from the product released date for the year.

Method of Processing Code

The code processing subsystem 18 processes the code 74 to determine the preparation information by: obtaining by means of the image capturing device 106 a digital image of the code; processing by means of the image processing device 92 digital data of the digital image to decode the information, in particular the preparation information; outputting by means of the output device 114 said decoded information.

Processing of the digital data comprises: locating the units 82, 86 in the code; identifying the reference units 86 and determining therefrom a reference point and/or a reference line r; determining for each data unit 82 on an encoding line a distance d along said line D from the reference line r; converting the determined distance d into an actual value of a parameter $V_p$; determining the location of the discrete positions 102, determining if they comprise a data unit 82, and deriving therefrom a parameter $V_p$, or a characteristic of a parameter $V_p$, which may be encoded by the data unit 82 of the encoding line D.

Locating the units 82, 86 in the code is generally achieved by conversion of the pixels represented in the digital data to a one-bit bi-tonal black and white image, i.e. a binary image, whereby the associated conversion parameters are set to distinguish the units from their surrounding base level. Alternatively an oversampled binary image sensor may be used as the image capturing device 106 to provide the binary image. Locations of the centre of units may be determined by a feature extraction technique such as circle Hough Transform. Different sized units may be identified by pixel integration.

Identification of the reference units 86 and determining therefrom a reference point and/or a reference line r; is generally achieved by identification of one or a combination of: units that have a linear arrangement; units that are a predetermined and/or greatest distance apart; units that are a particular shape or size or colour; units with a particular configuration. Generally an orientation identifier 88 of the reference line r is initially determined by identifying one or a combination of: a reference unit 86 that is a different shape or size or colour from the other reference units; a reference unit 86 that does not have associated therewith a data unit 82 on an encoding line D; a plurality of reference units with a specific configuration. Thereafter the reference line r may be determined by identifying a reference unit 86 with a predetermined/greatest distance therefrom and/or by identifying a specific alignment of reference units. A specific configuration may be identified by searching for said configuration, e.g. units which have a polygon arrangement, from which the reference point can be extracted, e.g. by finding a centre or another specific geometric point of said configuration.

Determining the reference point and the reference line r when processing the code allows determining the orientation of the code in the captured image prior to decoding the information. The image of the code may thus be captured in any direction without affecting the decoding accuracy. The container bearing the code thus doesn't need to be aligned in a specific orientation relative to the image capturing device, thereby simplifying the construction of the machine and the processing of the container in the machine. In that sense, it is not necessary to require the consumer to orientate the container before inserting it into the food or beverage preparation device. Usage of a container bearing a code according to the invention is thus user-friendly.

Determining for each data unit 82 a distance d along the associated encoding line D from the associated reference position 84 of the reference line r may be achieved by determining the circumferential distance from the centre of a data unit 82 (or in the event metadata is encoded via the second embodiment the position where a line from the centre of the data unit intersects orthogonally the encoding line D) to the associated reference position 84. This is conveniently achieved by the product of: an angle in radians between the reference line r and a radial line to the data unit 82; and the overall circumference of the encoding line D (which is defined by the associated reference position 84). Alternatively determining said distance d may comprise determining an angular distance, i.e. by means of the angle in radians between the reference line r and a radial line to the data unit 8 (typically its centre), whereby the radial distance may be used to identify the data unit with respect to a reference position. The latter is preferable since less processing steps are required, moreover the precise radial distance is not required such that compensation for optional metadata encoding is obviated.

The determined distance d can be corrected using the magnification and/or distance of the image capturing device 106 away from the code 74 when the image was captured.

Converting the determined distance d into an actual value of a parameter $V_p$ may comprise using stored information (e.g. information stored on the memory subsystem 112) which defines a relationship between the parameter and distance d. This step may be performed at the image processing device 92 or processing subsystem 50. The relationship may be linear, e.g. $V_p \propto d$. Alternatively it may be non-linear. A non-linear relationship may comprise a logarithmic relationship, e.g. $V_p \propto \log(d)$ or an exponential relationship, e.g. $V_p \propto e^d$. Such a relationship is particular advantageous when the accuracy of a parameter is important at low values and less important at high values or the converse e.g. for the second embodiment of the container processing subsystem 14 the accuracy of the angular velocities W1, W2 of the mixing unit are more important at a low angular velocity than at a high angular velocity, hence an exponential relationship is preferable.

As the circumference of the encoding lines D decreases with proximity to the centre of the annular encoding area 90 (i.e. the location of the orientation identifier 88 in the illustrated examples) the accuracy of the determined distance d is less. Advantageously, the parameters that require a higher level of precision can be arranged distal said centre and those that do not require a high level of precision can be arranged proximal said centre. As an example, for the second embodiment of the container processing subsystem 14, the accuracy of the angular velocities W1, W2 of the mixing unit are more important hence they are located distal said centre, and the accuracy of the percentage cooling power is less important hence it is located proximal said centre.

The aforesaid metadata about the parameter can be determined depending on the embodiment of encoding, e.g.: in the first embodiment by determining for the associated data unit 82 a unit length by feature extraction or overall area by pixel integration; in the second embodiment by determining for the associated data unit 82 an offset to the encoding line D by feature extraction; in the third and fourth embodiment by determining the centre of the associated data units by feature extraction.

According to embodiments of the code, each data unit 82 encoding a distance d along a corresponding encoding line D encodes the value $V_p$ of another parameter required for the preparation of the desired foodstuff/beverage. For example, each data unit 82 encoding a distance d along an encoding line D encodes the value of a processing parameter such as a processing temperature, a processing time, a liquid volume, a mixing speed, etc. for a particular preparation phase, different from the processing parameters whose values are encoded by the other such data units 82 of the code.

Determining the location of the discrete positions 102A-C may comprise using the identified position of the reference line r. It may further comprise using: stored information (i.e. information stored on the memory subsystem 112) e.g. there are a known number of discrete positions 102 arranged at known locations with respect to the position of the reference line r; and/or the arrangement of a data unit 82 along an encoding line D. In an embodiment the position of a data unit along the encoding line may encode the number and arrangement of the discrete positions (e.g. certain positions of the data unit 82 encode particular configurations of the discrete positions 102). Determining if the discrete positions comprise a data unit 82 may comprise feature extraction or other known technique. Deriving from the presence of the data units 82 at the discrete positions 102 a parameter $V_p$ may comprise using stored information (e.g. a look up table stored on the memory subsystem 112) to decode the encoded parameter(s).

Machine and Container Attachments

Figure 6:
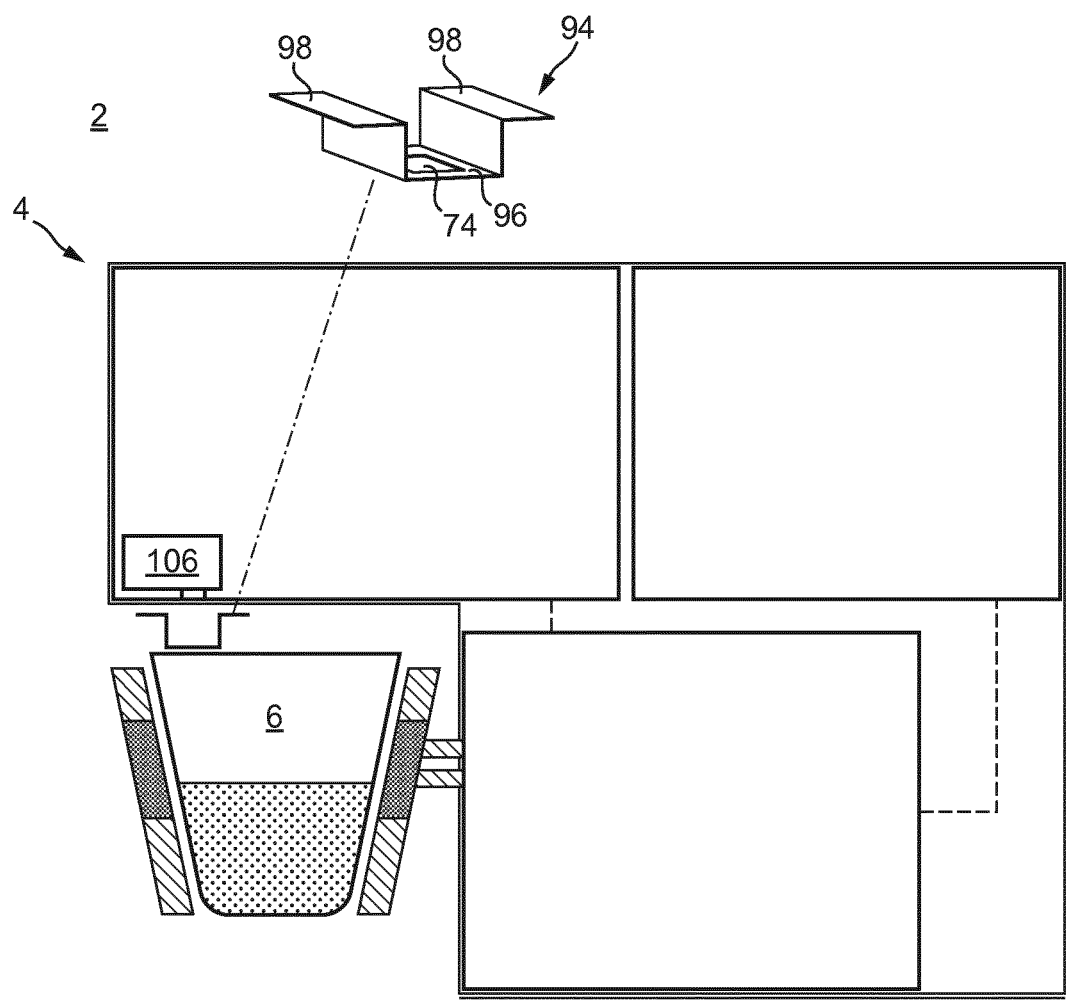
FIG. 6-7 are diagrammatic drawings illustrating attachments for the system of FIG. 1 according to an embodiment of the present disclosure.

An attachment 94 may comprise the afore-described code 74 arranged on a surface thereof, the attachment 94 configured for attachment to the afore-described beverage or foodstuff preparation machine 4. The attachment, an example which is illustrated in FIG. 6, comprises: a carrier 96 for carrying the code 74; an attachment member 98 for attachment of the carrier 96 to the machine 4 between an image capturing device 106 of said machine 4 and a container 6 received by said machine 4 and proximate said container. In this way an image of the code 74 can be captured by the image capturing device 1106 as if it were attached to the container 6. Examples of suitable attachment members comprise: extensions attached to said carrier comprising an adhesive strip (as illustrated); a mechanical fastener such as a clip, bolt or bracket. The use of such an attachment 94 is particularly useful if: only one type of container 6 is used on the machine 4; a clean or other maintenance related operation is required.

Figure 7:
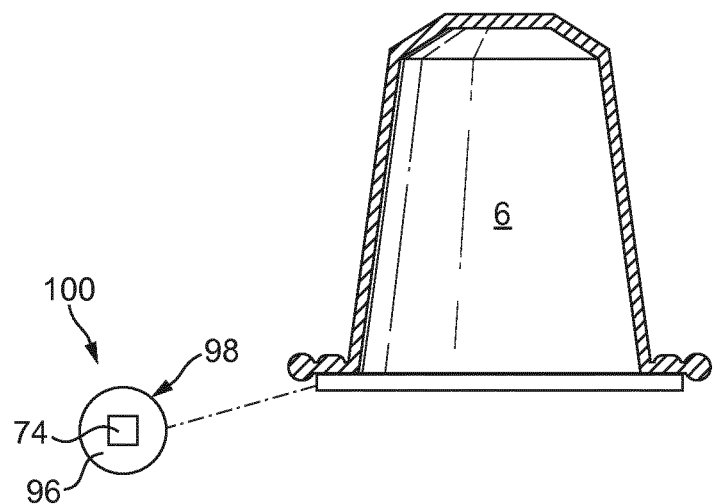

An alternate attachment 100 may comprise the afore-described code 74, arranged on a surface thereof, the attachment 100 configured for attachment to any of the afore-described containers 6. The attachment 100, an example which is illustrated in FIG. 7, comprises: a carrier 96 for carrying of the code 74; an attachment member 98 for attachment of the carrier 96 to the container 6. In this way an image of the code 74 can be captured by the image capturing device 106 as if it were formed integrally on the container 6. Examples of suitable attachment members comprise: an adhesive strip (as illustrated); a mechanical fastener such as a clip, bolt or bracket. The use of such an attachment 94 is particularly useful if: an end-user defined recipe is applied to the container 6; a clean or other maintenance related operation is required; it is more cost effective to form the code 74 on a substrate separate from the container 6 and attach said substrate to the container.

Example 1

According to this example, the beverage preparation machine is a coffee machine adapted to prepare coffee and/or coffee based beverages by brewing ground coffee contained in a container, for example in a capsule or a pouch.

Each container comprises a code printed on its outer surface to be read by the image capturing device of the machine. The code is preferably printed with a laser engraved cylinder during production of the laminate material from which the containers are made. The code is preferably repeatedly printed on the container, preferably in a tessellating manner. The code is for example repeatedly printed on an entire surface or surface portion of the container, such that the image capturing device of the coffee machine may capture the image of at least one code, or of portions of codes allowing the image processing device to reconstitute the code, when the container is correctly inserted in the machine, independently of the particular orientation of the container in the machine.

The code comprises a reference portion comprising three reference units arranged in an isosceles right-angled triangle configuration, i.e. arranged at the vertices of a right-angled triangle with the two legs equal. The reference units define a reference point at the centre of the triangle's circumcircle, i.e. at the centre of the circle passing through all vertices of the triangle, i.e. through the centres of the three reference units arranged at said vertices. A reference line is defined as extending from the reference point in a direction parallel to a leg of the triangle, for example in a direction parallel to the upright portion of the "L"-shape formed by the three reference units and away from the basis of said "L"-shape. The code further comprises a data portion comprising an annular encoding area arranged around the reference portion and comprising four concentric circular encoding lines centred on the reference point, on which data units may be arranged to encode information.

The reference units and the data units are preferably identical in shape, size and colour and are for example dots having a diameter of 60 μm. The length of each leg of the right-angled triangle of the reference portion is for example 125 μm, i.e. the centres of two reference units arranged at the opposite ends of a same leg of the right-angled triangle are 125 μm apart. Experiments with a Sonix SN9S102-based image capturing device have shown that, in order to avoid confusion between data units of the data portion and the reference units of the right-angled triangle configuration when using such dimension of units and such distances between the reference units, two neighbouring data units on an encoding line are preferably separated by a linear distance of at least 250 μm. At a radius R μm, a linear distance of 250 μm corresponds to an angle at the centre of the encoding line of:

$$\alpha = 2 \cdot \sin^{-1}\left(\frac{250/2}{R}\right)$$

between two adjacent data units. The four encoding lines for example have respective radii of $R_1$=255 μm, $R_2$=375 μm, $R_3$=495 μm and $R_4$=615 μm. A minimal linear distance of 250 μm between two adjacent dots on a same encoding line thus corresponds to respective minimal angles at the centre of $\alpha_1$=58.71°, $\alpha_2$=38.94°. $\alpha_3$=29.25° and $\alpha_4$=23.45°.

The reference point, the reference lines and the encoding lines are not printed on the container. Only the reference and data units, i.e. the dots, are printed when printing the code. The reference point, the reference line and the encoding lines are construction elements used when encoding information in order to determine the locations of the data units relative to the reference units before printing them on the container, and when decoding the preparation information by the code processing unit of the coffee machine in order to retrieve the parameter values encoded by the data units.

The encoded preparation information preferably comprises a beverage volume and temperature, and for example time and pressure information. The parameter values encoded in a code printed on a particular container are specific to the content of the container, i.e. the parameter values encoded on a particular container have been chosen to optimize the processing by the coffee machine of the material contained in the container, for example a particular type of ground coffee, in order to achieve the best possible result.

The temperature parameter value is for example encoded on the inner most encoding line having a radius $R_1$=255 μm.

The temperature value may for example vary from 0° C. to 100° C. The temperature value is for example encoded on a useful angular range of 360°-60°=300° in order to avoid any risk of confusion between the lowest and the highest possible value of the range when decoding the encoded value, for example on a useful range extending from an angular distance of 30° from the reference line to an angular distance of 330° from the reference line. The temperature is for example encoded linearly, where the encoded volume parameter value is proportional to the angular distance from the reference line, i.e. to the distance from the reference line along the encoding line. A data unit arranged for example at an angular distance of 30° from the reference line encodes a temperature value of 0° C., a data unit arranged at an angular distance of 180° from the reference line encodes a temperature value of 50° C. and a data unit arranged at an angular distance of 330° from the reference line encodes a temperature value of 100° C. The one skilled in the art will understand that the data unit may be arranged at any position within the useful angular range of the first encoding line in order to correspondingly encode any desired temperature parameter value within the defined value range.

The volume parameter value is for example encoded on the second encoding line having a radius $R_2=375$ μm. The volume value may vary from 0 ml to 320 ml. The volume value is for example encoded linearly on a useful angular range of 360°-40°=320° in order to avoid any risk of confusion between the lowest and the highest possible value of the range when decoding the encoded value. The volume value is for example encoded on a range extending from an angular distance of 20° from the reference line to an angular distance of 340° from the reference line, wherein a data unit arranged for example at an angular distance of 20° from the reference line encodes a volume value of 0 ml, a data unit arranged at an angular distance of 70° from the reference line encodes a volume value of 50 ml and a data unit arranged at an angular distance of 340° from the reference line encodes a volume value of 320 ml. The one skilled in the art will understand that the data unit may be arranged at any position within the useful angular range of the second encoding line in order to correspondingly encode any desired volume parameter value within the defined value range.

The third encoding line with a radius $R_3=495$ μm is for example used for encoding a value of the cut-off pressure of the pump injecting water in the container when brewing the ground coffee contained therein. The pressure value may vary from 10 bar to 20 bar. The cut-off pressure value is for example encoded linearly on a useful angular range of 360°-30°=330° in order to avoid any risk of confusion between the lowest and the highest possible value of the range when decoding the encoded value. The cut-off pressure value is for example encoded on a range extending from an angular distance of 15° from the reference line to an angular distance of 345° from the reference line, wherein a data unit arranged for example at an angular distance of 15° from the reference line encodes a cut-off pressure value of 10 bar, a data unit arranged at an angular distance of 180° from the reference line encodes a cut-off pressure value of 15 bar and a data unit arranged at an angular distance of 345° from the reference line encodes a cut-off pressure value of 20 bar. The one skilled in the art will of course understand that the value range may be defined differently depending on the characteristics of the machine's pump. Furthermore, the data unit may be arranged at any position within the useful angular range of the third encoding line in order to correspondingly encode any desired cut-off pressure parameter value within the defined value range.

Optionally, the fourth encoding line may be used for encoding a time duration, for example a maximal coffee preparation time duration. The time duration value range may for example extend from 0 s to 330 s. The time duration value is for example encoded linearly on a useful angular range of the fourth encoding line of 360°-30°=330° in order to avoid any risk of confusion between the lowest and the highest possible value of the range when decoding the encoded value. The time duration value is for example encoded on a range extending from an angular distance of 15° from the reference line to an angular distance of 345° from the reference line, wherein a data unit arranged for example at an angular distance of 15° from the reference line encodes a duration time of 0 s, a data unit arranged at an angular distance of 110° from the reference line encodes a time duration value of 95 s and a data unit arranged at an angular distance of 345° from the reference line encodes a time duration value of 330 s. The one skilled in the art will understand that the data unit may be arranged at any position within the useful angular range of the fourth encoding line in order to correspondingly encode any desired time duration parameter value within the defined value range.

The code further comprises discrete positions at predetermined known locations defined relative to the code's reference line and/or reference point. The code for example comprises four discrete positions located close to each corner of the code's square planform, wherein the discrete positions are located on the code's planform and outside the outer most encoding line, similarly to the discrete positions 102 illustrated by way of example in FIGS. 4A and 4B. The code thus for example comprises sixteen discrete positions that each may or may not comprise a data unit, thereby allowing encoding 16 bits of digital information, where the presence of a data unit for example corresponds to a "1" while no data unit present corresponds to a "0".

The 16 bits are for example used to encode information about the material contained in the container, for example a coffee type, origin, roasting level, etc.

In an embodiment, the coffee machine is adapted to prepare the coffee in several phases, for example a pre-wetting phase, a high pressure extraction phase and a low pressure flow phase, wherein each phase requires different temperature, volume, pressure and time duration parameter values. The parameters for each phase are then preferably encoded separately on different codes that are then printed in a tessellating manner on the container. In this embodiment, at least some of the discrete positions of each code, for example two discrete positions per code, are used for encoding the number of the phase whose parameters are encoded in the particular code. The codes relating to the successive phases are then for example printed in columns over the entire surface or surface portion of the container, where a first column comprises the repeated code encoding the parameters for the first phase, a second column comprises the repeated code encoding the parameters for the second phase, a third column comprises the repeated code encoding the parameters for the third phase, etc.

When a container is inserted in the coffee machine, the machine's image capturing device captures an image of the container's surface. The digital image data is provided to the image processing device, which looks for a dot configuration corresponding to the right angled triangle configuration of the reference portion. The image processing device then calculates the positions of the reference points and of the reference line and determines the position relative to the reference line of each data unit present in the planform centred on said configuration in order to retrieve the encoded information. For the data unit present on each of the first, second, third and fourth encoding lines, the image processing device measures its angular distance, or the distance along the encoding line, from the reference line in order to determine the correspondingly encoded parameter value. The image processing device further determines the locations of the discrete positions relative to the reference line and analyses the image data corresponding to these positions in order to determine whether a data unit is present or not in order to retrieve the digitally encoded information. The retrieved parameter values and the decoded information are then transmitted to the machine's container processing subsystem in order for the coffee machine to process the container accordingly. If the captured digital image does not encompass any entire planform of a code, the image processing device reconstructs a planform using fragments of several neighbouring codes captured in the image. Optionally, the code processing subsystem uses two or more images of the container's surface and processes image data of a plurality of codes in order to perform error detection and/or correction. The two or more images are captured by two or more image capturing devices and/or by moving an image capturing device relative to the container. Similarly, in the case where parameters for several preparation phases are encoded in several codes, the code processing subsystem uses several images of the container's surface in order to obtain at least one image of each different code.

Example 2

According to this second example, the beverage preparation machine is a machine adapted to prepare various beverages from material contained in one or more containers, typically two containers. The material mainly comprises soluble ingredients contained in pouches and/or ingredients to be brewed such as for example ground coffee or tea leaves. The machine for example allows preparing coffee and milk-based beverages, such as latte, cappuccino, etc., milk, oat milk or tea beverages, optionally with add-ons such as for example superfood, vegetables, fruit, nuts, cereals, vitamins, etc., tea, or any combination thereof. The machine comprises a container processing subsystem comprising two dissolution units, or a dissolution and a brewing unit, or a combination thereof, in order to allow the preparation of beverages by simultaneously or sequentially processing two containers simultaneously present in the machine's container processing subsystem. The machine preferably comprises at least one image capturing device per dissolution or brewing unit in order to capture at least part of a surface of a container inserted in said unit.

Each container comprises a code printed on its outer surface to be read by the corresponding image capturing device of the machine. The code is preferably printed with a laser engraved cylinder during production of the laminate material from which the containers are made. The code is preferably repeatedly printed on the container, preferably in a tessellating manner. The code is for example repeatedly printed on an entire surface or surface portion of the container, such that the corresponding image capturing device of the machine may capture the image of at least one code, or of portions of codes allowing the image processing device to reconstitute the code, when the container is correctly inserted in the machine, independently of the particular orientation of the container in the machine.

The code comprises a reference portion comprising three reference units arranged in an isosceles right-angled triangle configuration, i.e. arranged at the vertices of a right-angled triangle with the two legs equal. The reference units define a reference point at the centre of the triangle's circumcircle, i.e. at the centre of the circle passing through all vertices of the triangle, i.e. through the centres of the three reference units arranged at said vertices. A reference line is defined as extending from the reference point in a direction parallel to a leg of the triangle, for example in a direction parallel to the upright portion of the "L-shape" formed by the three reference units and away from the basis of said "L"-shape. The code further comprises a data area comprising an annular encoding portion arranged around the reference portion and comprising four concentric circular encoding lines centred on the reference point, on which data units may be arranged to encode information.

The reference units and the data units are preferably identical in shape, size and colour and are for example dots having a diameter of 60 µm. The length of each leg of the right-angled triangle of the reference portion is for example 125 µm, i.e. the centres of two reference units arranged at the opposite ends of a same leg of the right-angled triangle are 125 µm apart. Experiments with a Sonix SN9S102-based image capturing device have shown that, in order to avoid confusion between data units of the data portion and the reference units of the right-angled triangle configuration when using such dimension of units and such distances between the reference units, two neighbouring data units on an encoding line are preferably separated by a linear distance of at least 250 µm. At a radius R µm, a linear distance of 250 µm corresponds to an angle at the centre of the encoding line of:

$$\alpha = 2 \cdot \sin^{-1}\left(\frac{250/2}{R}\right)$$

between two adjacent data units. The four encoding lines for example have respective radii of $R_1=255$ µm, $R_2=375$ µm, $R_3=495$ µm and $R_4=615$ µm. A minimal linear distance of 250 µm between two adjacent dots thus corresponds to respective minimal angles at the centre of $\alpha_1=58.71°$, $\alpha_2=38.94°$, $\alpha_3=29.25°$ and $\alpha_4=23.45°$.

The reference point, the reference line and the encoding lines are not printed on the container. Only the reference and data units, i.e. the dots, are printed when printing the code. The reference point, the reference line and the encoding lines are construction elements used when encoding information in order to determine the locations of the data units relative to the reference units before printing them on the container, and when decoding the preparation information by the code processing unit of the machine in order to retrieve the parameter values encoded by the data units.

The encoded preparation information preferably comprises a volume and temperature of a mixing or brewing liquid, typically water, for optimally processing the material contained in the container, and for example time, pressure and/or flow information for successive processing phases. The parameter values encoded in a code printed on a particular container are specific to the content of the container, i.e. the parameter values encoded on a particular container have been chosen to optimize the processing by the machine of the material contained in the container, for example a particular type of soluble ingredient, in order to achieve the best possible result.

The temperature parameter value is for example encoded on the inner most encoding line having a radius $R_1=255$ µm. The temperature value may for example vary from 0° C. to 100° C. The temperature value is for example encoded on a useful angular range of 360°-60°=300° in order to avoid any risk of confusion between the lowest and the highest possible value of the range when decoding the encoded value, for example on a useful range extending from an angular distance of 30° from the reference line to an angular distance of 330° from the reference line. The temperature is for example encoded linearly, where the encoded volume parameter value is proportional to the angular distance from the reference line, i.e. to the distance from the reference line along the encoding line. A data unit arranged for example at an angular distance of 30° from the reference line encodes a temperature value of 0° C., a data unit arranged at an angular distance of 180° from the reference line encodes a temperature value of 50° C. and a data unit arranged at an angular distance of 330° from the reference line encodes a temperature value of 100° C. The one skilled in the art will understand that the data unit may be arranged at any position within the useful angular range of the first encoding line in order to correspondingly encode any desired temperature parameter value within the defined value range.

The volume parameter value is for example encoded on the second encoding line having a radius $R_2=375$ µm. The volume value may vary from 0 ml to 320 ml. The volume value is for example encoded linearly on a useful angular range of 360°-40°=320° in order to avoid any risk of confusion between the lowest and the highest possible value of the range when decoding the encoded value. The volume value is for example encoded on a range extending from an angular distance of 20° from the reference line to an angular distance of 340° from the reference line, wherein a data unit arranged for example at an angular distance of 20° from the reference line encodes a volume value of 0 ml, a data unit arranged at an angular distance of 70° from the reference line encodes a volume value of 50 ml and a data unit arranged at an angular distance of 340° from the reference line encodes a volume value of 320 ml. The one skilled in the art will understand that the data unit may be arranged at any position within the useful angular range of the second encoding line in order to correspondingly encode any desired volume parameter value within the defined value range.

The third encoding line with a radius $R_3=495$ µm is for example used for encoding a value of the cut-off pressure of the pump injecting water in the container when diluting and/or brewing the material contained therein. The pressure value may vary from 0 bar to 20 bar. The cut-off pressure value is for example encoded linearly on a useful angular range of 360°-30°=330° in order to avoid any risk of confusion between the lowest and the highest possible value of the range when decoding the encoded value. The cut-off pressure value is for example encoded on a range extending from an angular distance of 15° from the reference line to an angular distance of 345° from the reference line, wherein a data unit arranged for example at an angular distance of 15° from the reference line encodes a cut-off pressure value of 0 bar, a data unit arranged at an angular distance of 180° from the reference line encodes a cut-off pressure value of 10 bar and a data unit arranged at an angular distance of 345° from the reference line encodes a cut-off pressure value of 20 bar. The one skilled in the art will of course understand that the value range may be defined differently depending on the characteristics of the machine's pump. Furthermore, the data unit may be arranged at any position within the useful angular range of the third encoding line in order to correspondingly encode any desired cut-off pressure parameter value within the defined value range.

Optionally, the fourth encoding line may be used for encoding a time duration, for example a maximal beverage preparation time duration. The time duration value range may for example extend from 0 s to 330 s. The time duration value is for example encoded linearly on a useful angular range of the fourth encoding line of 360°-30°=330° in order to avoid any risk of confusion between the lowest and the highest possible value of the range when decoding the encoded value. The time duration value is for example encoded on a range extending from an angular distance of 15° from the reference line to an angular distance of 345° from the reference line, wherein a data unit arranged for example at an angular distance of 15° from the reference line encodes a duration time of 0 s, a data unit arranged at an angular distance of 110° from the reference line encodes a time duration value of 95 s and a data unit arranged at an angular distance of 345° from the reference line encodes a time duration value of 330 s. The one skilled in the art will understand that the data unit may be arranged at any position within the useful angular range of the fourth encoding line in order to correspondingly encode any desired time duration parameter value within the defined value range.

The code further comprises discrete positions at predetermined known locations defined relative to the code's reference line and/or reference point. The code for example comprises four discrete positions located close to each corner of the code's square planform, wherein the discrete positions are located on the code's planform and outside the outer most encoding line, similarly to the discrete positions 102 illustrated by way of example in FIGS. 4A and 4B. The code thus for example comprises sixteen discrete positions that each may or may not comprise a data unit, thereby allowing encoding 16 bits of digital information, where the presence of a data unit for example corresponds to a "1" while no data unit present corresponds to a "0".

The 16 bits are for example used to digitally encode information about the material contained in the container, for example a milk, coffee or add-on type, origin, roasting level, flavour, etc.

In an embodiment, the machine is adapted to prepare beverages by processing one or more containers in several phases, wherein each phase requires different temperature, volume, pressure and time duration parameter values. The parameters for each phase are preferably encoded separately on different executions of the code that are printed in a tessellating manner on the container. In this embodiment, at least some of the discrete positions of each code, for example two discrete positions per code, are used for encoding the number of the phase whose parameters are encoded in the particular code. The codes relating to the successive phases are then for example printed in columns over the entire surface or surface portion of the container, where a first column comprises the repeated code encoding the parameters for the first phase, a second column comprises the repeated code encoding the parameters for the second phase, a third column comprises the repeated code encoding the parameters for the third phase, etc.

When one or two containers are inserted in the machine, the machine's image capturing devices capture images of the containers' surface. The digital image data is provided to the image processing device, which looks in each image for a dot configuration corresponding to the right angled triangle configuration of the reference portion. The image processing device then calculates the position of the respective reference point and line and determines the position relative to the respective reference line of each data unit present in the planform of each code centred on said configuration in order to retrieve the encoded parameter values for each container. For the data unit present on each of the first, second, third and fourth encoding lines of each code of each container, the image processing device measures its angular distance, or the distance along the encoding line, from the reference line in order to determine the correspondingly encoded parameter value. The image processing device further determines for each code of each container the locations of the discrete positions relative to the reference line and analyses the image data corresponding to these positions in order to determine whether a data unit is present or not in order to retrieve the digitally encoded information. The retrieved parameter values and the decoded information for each code, for example for each preparation phase, and for each container are transmitted to the machine's container processing subsystem in order for the machine to process the containers accordingly. If the captured digital images do not encompass any entire planform of a code, the image processing device reconstructs a planform using fragments of several neighbouring codes captured in a same image. Optionally, the code processing subsystem uses two or more images of each container's surface and processes image data of a plurality of respective codes in order to perform error detection and/or correction. The two or more images of each container are captured by two or more image capturing devices per processing unit and/or by moving the image capturing device relative to the corresponding container. Similarly, in the case where parameters for several preparation phases are encoded in several codes, the code processing subsystem uses several images of each container's surface in order to obtain at least one image of each different code in order to process accordingly the one or more containers in one or more phases.

LIST OF REFERENCES

2 Beverage or Foodstuff Preparation System
4 Beverage or Foodstuff Preparation Machine
   10 Housing
      108 Base
      110 Body
   14 Container processing subsystem
      12 Fluid supply
         20 Reservoir
         22 Fluid pump
         24 Fluid thermal exchanger
      Embodiment 1
      26 Extraction Unit
         28 Injection head
         30 Capsule holder
         32 Capsule holder loading system
         34A Capsule insertion channel
         34B Capsule ejection channel
      Embodiment 2
         40 Agitator unit
         42 Auxiliary product unit
         44 Thermal exchanger
         46 Receptacle support
   16 Control subsystem
      48 User interface
      50 Processing subsystem
      112 Memory subsystem
         116 Preparation program
      52 Sensors (temperature, receptacle level, flow rate, torque, velocity)
      54 Power supply
      56 Communication interface
   18 Code processing subsystem
      106 Image capturing device
      92 Image processing device
      114 Output device
6 Container (Capsule/Receptacle/Packet)

-continued

LIST OF REFERENCES

Capsule/Receptacle
58 Body portion
60 Lid portion
62 Flange portion
Packet
64 Sheet material
66 Internal volume
68 Inlet
70 Outlet
   74 Code
      104 Planform
      76 Unit
         78 Data portion
            90 Encoding area
            82 Data unit
            102 Discrete position
         80 Reference portion
            84 Reference position
            86 Reference unit
               88 Orientation identifier

The invention claimed is:

1. A container for a beverage preparation machine or foodstuff preparation machine, the container for containing beverage or foodstuff material and comprising a code encoding preparation information, the code comprising a reference portion and a data portion:

the reference portion comprising an arrangement of at least two reference units defining a virtual reference line;

the data portion comprising:

a data unit arranged on a virtual encoding line which intersects the virtual reference line at a virtual intersection point, the data unit being arranged at any continuous distance from the virtual intersection point along the virtual encoding line, the distance along the virtual encoding line continuously encoding a value of a parameter of the preparation information as a function of the distance, wherein the virtual encoding line is circular or comprises a segment of a circle and is arranged with a tangent thereto orthogonal the virtual reference line at the virtual intersection point; and a one or more discrete positions arranged on the virtual encoding line at known locations with respect to the arrangement of the data unit along the virtual encoding line, wherein each of the one or more discrete positions either comprise or do not comprise a further data unit as a variable to at least partially encode a parameter of the preparation information, wherein at least one of the one or more discrete positions comprises the further data unit.

2. The container according to claim 1, wherein the code comprises a plurality of virtual encoding lines, wherein the plurality of virtual encoding lines are concentrically arranged and each virtual encoding line in the plurality of virtual encoding lines intersect the virtual reference line at a different position; and each virtual encoding line in the plurality of virtual encoding lines comprising a corresponding arrangement of a data unit and a discrete position of the one or more of discrete positions.

3. The container according to claim 1, wherein the virtual encoding line is arranged within a rectangular virtual planform and further discrete positions additional to the one or more discrete positions are arranged at known locations with respect to the position of the virtual reference line at an outer periphery of the virtual encoding line, wherein the further discrete positions are arranged within the virtual planform and are proximal one or more vertices thereof.

4. The container according to claim 1, wherein the code has a peripheral length of 600-1600 µm.

5. The container according to claim 1, wherein the code is formed on a surface of the container or on an attachment, which is attached thereto.

6. The container according to claim 1, wherein the container has a structure selected from the group consisting of: a capsule; a packet; a receptacle for end user consumption of the beverage or foodstuff therefrom; and a collapsible container.

7. The container according to claim 1, wherein at least one of the one or more discrete positions does not comprise the further data unit.

8. The container according to claim 1, wherein the one or more discrete positions comprises a first discrete position, a second discrete position, and a third discrete position, wherein the first discrete position comprises a first further data unit, wherein the second discrete position comprises a second further data unit, and wherein the third discrete position is absent of the further data unit.

9. The container according to claim 1, wherein the one or more discrete positions comprises a first plurality of one or more discrete positions and a second plurality of one or more discrete positions, wherein each discrete position in the first plurality of one or more discrete positions comprises a further data unit, and wherein each discrete position in the second plurality of one or more discrete positions does not comprise a further data unit.

10. An attachment configured for attachment to a container for a beverage or foodstuff preparation machine, the container for containing beverage or foodstuff material, the attachment comprising:
a carrier carrying a code comprising:
a reference portion and a data portion,
the reference portion comprising an arrangement of at least two reference units defining a virtual reference line;
the data portion comprising:
a data unit arranged on a virtual encoding line which intersects the virtual reference line at a virtual intersection point, the data unit being arranged at any continuous distance from the virtual intersection point along the virtual encoding line, the distance along the virtual encoding line continuously encoding a value of a parameter of the preparation information as a function of the distance, wherein the virtual encoding line is circular or comprises a segment of a circle and is arranged with a tangent thereto orthogonal the virtual reference line at the virtual intersection point; and
a one or more of discrete positions arranged on the virtual encoding line at known locations with respect to the arrangement of said data unit along said virtual encoding line, wherein each of the one or more discrete positions either comprise or do not comprise a further data unit as a variable to at least partially encode a parameter of the preparation information, wherein at least one of the one or more of discrete positions comprises the further data unit; and
an attachment member for attachment to the container.

11. A method of encoding preparation information, the method comprising forming a code on:
a container for a beverage preparation machine or foodstuff preparation machine, the container for containing beverage or foodstuff material; or
an attachment for attachment to the container or the beverage preparation machine or foodstuff preparation machine,
the method further comprising:
arranging at least two reference units to define a virtual reference line of a reference portion;
encoding a value of a parameter of the preparation information with a data portion of the code by arranging a data unit on a virtual encoding line that intersects the virtual reference line at a virtual intersection point, the data unit being arranged a distance extending from virtual intersection point along the virtual encoding line the distance along the virtual encoding line encoding the value, and the virtual encoding line is circular or comprises a segment of a circle and is arranged with a tangent thereto orthogonal the virtual reference line at the virtual intersection point; and
at least partially encoding a parameter of the preparation information with one or more discrete positions which are arranged at known locations on said virtual encoding line with respect to the arrangement of the data unit along the virtual encoding line, wherein the one or more discrete positions either comprise or do not comprise a further data unit as a variable to at least partially encode a parameter of the preparation information.

12. The method of encoding preparation information according to claim 11, the method further comprising:
obtaining a digital image of the code of the container;
processing the digital image to decode the encoded preparation information; and
controlling a preparation process using said preparation information,
wherein decoding the encoded preparation information comprises:
determining therefrom a virtual reference line;
determining for a data unit a distance along the virtual encoding line from the virtual reference line;
converting the distance into a value of a parameter, using a stored relationship between the parameter and distance; and
determining the location of the one or more discrete positions on the virtual encoding line with respect to the location of the data unit, determining if the one or more discrete positions comprise a further data unit, deriving at least partially therefrom a parameter of the preparation information.

* * * * *